US012628064B2

(12) United States Patent
Min et al.

(10) Patent No.: US 12,628,064 B2
(45) Date of Patent: May 12, 2026

(54) ELECTRONIC DEVICE FOR WLAN COMMUNICATION AND OPERATING METHOD THEREOF

(71) Applicant: SAMSUNG ELECTRONICS CO., LTD., Suwon-si (KR)

(72) Inventors: Hyunkee Min, Suwon-si (KR); Wonbin Park, Suwon-si (KR); Kiyeong Jeong, Suwon-si (KR); Junsu Choi, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 18/494,697

(22) Filed: Oct. 25, 2023

(65) Prior Publication Data

US 2024/0147343 A1     May 2, 2024

Related U.S. Application Data

(63) Continuation of application No. PCT/KR2023/016490, filed on Oct. 23, 2023.

(30) Foreign Application Priority Data

Nov. 1, 2022     (KR) ........................ 10-2022-0143409
Dec. 13, 2022     (KR) ........................ 10-2022-0173736

(51) Int. Cl.
*H04W 40/12*          (2009.01)
*H04W 84/12*          (2009.01)
(52) U.S. Cl.
CPC ............ *H04W 40/12* (2013.01); *H04W 84/12* (2013.01)
(58) Field of Classification Search
CPC ..... H04W 40/12; H04W 84/12; H04W 88/06; H04W 24/02; H04W 24/08; H04W 76/15; H04W 76/19; H04L 67/02
See application file for complete search history.

(56) References Cited

U.S. PATENT DOCUMENTS

2002/0197997 A1*  12/2002  Attar ................... H04W 36/304
                                                                      455/446
2003/0210668 A1   11/2003  Malladi et al.
                                    (Continued)

FOREIGN PATENT DOCUMENTS

CN          113498175 A      10/2021
CN          115087056 A       9/2022
                        (Continued)

OTHER PUBLICATIONS

L. Liu, Y. Chang, S. Song and D. Yang, "On adaptive range expansion for UL-DL imbalance mitigation in HSPA HetNet," 2015 IEEE Wireless Communications and Networking Conference (WCNC), New Orleans, LS, USA, 2015, pp. 1440-1445 (Year: 2015).*
                        (Continued)

*Primary Examiner* — Thomas R Cairns
*Assistant Examiner* — Raenita Ann Fenner
(74) *Attorney, Agent, or Firm* — Jefferson IP Law, LLP

(57) ABSTRACT

The disclosure relates to a method and an electronic device including a communication circuit and a processor. The processor may establish a plurality of links with an electronic device through the communication circuit, identify a downlink (DL) signal quality and an uplink (UL) signal quality of each of the plurality of links, detect at least one DL satisfying a predetermined first reference signal quality among the plurality of links, in a case that no link satisfying a second reference signal quality is detected among the plurality of links, perform a function related to improvement of UL signal qualities for the plurality of links, detect at least one UL satisfying the predetermined second reference signal quality, based on the performance of the function related to the improvement of the UL signal quality among the links, and perform the WLAN communication.

14 Claims, 9 Drawing Sheets

(56) References Cited

U.S. PATENT DOCUMENTS

| | | | |
|---|---|---|---|
| 2008/0123601 A1* | 5/2008 | Malladi ............... | H04W 52/286 |
| | | | 370/335 |
| 2010/0325267 A1* | 12/2010 | Mishra ................. | H04W 24/08 |
| | | | 709/224 |
| 2014/0221005 A1 | 8/2014 | Marshall et al. | |
| 2016/0278072 A1* | 9/2016 | Palle ................... | H04W 72/542 |
| 2017/0070904 A1* | 3/2017 | Mali ..................... | H04W 72/23 |
| 2017/0245190 A1* | 8/2017 | Katar ................... | H04W 36/26 |
| 2017/0257196 A1* | 9/2017 | Ghosh .................. | H04L 1/1854 |
| 2017/0280365 A1 | 9/2017 | Wang et al. | |
| 2017/0367067 A1* | 12/2017 | Hwang ................. | H04W 76/14 |
| 2019/0229796 A1* | 7/2019 | Wee .................... | H04W 72/046 |
| 2019/0364594 A1* | 11/2019 | Yang .................... | H04W 72/21 |
| 2021/0014911 A1* | 1/2021 | Patil ..................... | H04W 12/73 |
| 2021/0058936 A1 | 2/2021 | Gordaychik | |
| 2022/0070772 A1* | 3/2022 | Ho ..................... | H04W 28/0268 |
| 2022/0279375 A1 | 9/2022 | Kim et al. | |
| 2023/0119722 A1 | 4/2023 | Guo et al. | |
| 2023/0254920 A1 | 8/2023 | Kim | |
| 2023/0337306 A1 | 10/2023 | Jang et al. | |
| 2024/0098812 A1* | 3/2024 | Dong .................. | H04W 76/11 |

FOREIGN PATENT DOCUMENTS

| | | | |
|---|---|---|---|
| KR | 10-2021-0004869 A | 1/2021 | |
| KR | 10-2021-0157873 A | 12/2021 | |
| WO | 2021/002617 A1 | 1/2021 | |
| WO | 2022/128087 A1 | 6/2022 | |

OTHER PUBLICATIONS

P. JÃ¤nis, V. Koivunen and C. B. Ribeiro, "On the performance of flexible UL-DL switching point in TDD wireless networks," 2011 IEEE GLOBECOM Workshops (GC Wkshps), Houston, TX, USA, 2011, pp. 225-230 (Year: 2011).*

International Search Report for PCT/KR2023/016490 by Korean Intellectual Property Office dated Feb. 5, 2024.

Monajemi, Pooya et al., 'TID to Link Mapping for QoS', IEEE 802.11-22/1510r4. Sep. 28, 2022.

Shafin, Rubayet et al., 'Enhanced Device Connectivity with Robust QoS Support', IEEE 802.11-22/1528r1. Oct. 24, 2022.

European Search Report dated Oct. 8, 2025, issued in European Application No. 23886112.4.

* cited by examiner

ELECTRONIC DEVICE FOR WLAN COMMUNICATION AND OPERATING METHOD THEREOF

CROSS-REFERENCE TO RELATED APPLICATION

This application is a continuation application of International Application No. PCT/KR2023/016490, filed on Oct. 23, 2023, which claims priority from and derives the benefit of Korean Patent Application No. 10-2022-0143409, filed on Nov. 1, 2022, and further claims priority from and derives the benefit of Korean Patent Application No. 10-2022-10-2022-0173736, filed on Dec. 13, 2022, the entire contents of each of these applications is hereby incorporated in its entirety, by reference.

TECHNICAL FIELD

Various embodiments of the disclosure relate to an electronic device for wireless local area network (WLAN) communication and a method of operating the same.

BACKGROUND

A WLAN system may support wireless connections of various electronic devices such as smartphones, tablets, tablet personal computers (PCs), or notebooks through predetermined frequency bands (for example, a band of about 2.4 GHz, a band of about 5 GHz, and/or a band of about 6 GHz).

The WLAN system can be installed in not only private spaces such as a user's home but also public spaces such as an airport, a train station, an office, or a department store. The WLAN system may be defined in the institute of electrical and electronics engineers (IEEE) 802.11 standard. For example, the IEEE 802.11 standard is being developed to IEEE 802.11b, IEEE 802.11a, IEEE 802.11g, IEEE 802.11n, IEEE 802.11ac, IEEE 802.11ax, and IEEE 802.11be.

DISCLOSURE

An electronic device of a WLAN system may be connected to an access point (AP) and perform WLAN communication. The electronic device may have a smaller number of antennas and/or relatively lower transmission power for WLAN communication than the AP due to restriction of the size and/or the weight of the electronic device to move. As the electronic device uses the smaller number of antennas and/or relatively lower transmission power than the AP, the quality of an uplink (UL) signal, which the electronic device transmits to the AP, may be relatively lower than a quality of a downlink (DL) signal which the AP transmits to the AP. The use of WLAN communication using the AP by the electronic device may be restricted since transmission of the UL signal of the electronic device has failed due to the quality of the UL signal being relatively lower than the quality of the DL signal. For example, when the electronic device is located in a non-line of sight (NLOS) environment, the electronic device may receive the DL signal from the AP. However, the electronic device fails in transmission of the UL signal to the AP at the location of the NLOS environment, and thus WLAN communication using the AP may be restricted.

Various embodiments of the disclosure disclose an apparatus and a method of an electronic device for improving the quality of the UL signal and/or the DL signal with an external electronic device (for example, the AP).

The technical subjects pursued in the disclosure are not limited to the above-mentioned technical subjects, and other technical subjects which are not mentioned may be clearly understood through the following descriptions by those skilled in the art of the disclosure.

According to various embodiments, an electronic device may comprise a communication circuit configured to support WLAN communication and a processor operatively connected to the communication circuit. According to an embodiment, the processor may establish a plurality of links with an external electronic device through the communication circuit. According to an embodiment, the processor may identify a downlink (DL) signal quality and an uplink (UL) signal quality of each of the plurality of links. According to an embodiment, the processor may detect at least one DL satisfying a predetermined first reference signal quality among the plurality of links based on the DL signal quality. According to an embodiment, in a case that no link satisfying a predetermined second reference signal quality is detected among the plurality of links based on the UL signal quality, the processor may perform a function related to improvement of UL signal qualities for the plurality of links. According to an embodiment, the processor may detect at least one UL satisfying the predetermined second reference signal quality, based on the performance of the function related to the improvement of the UL signal quality among the plurality of links. According to an embodiment, the processor may perform the WLAN communication with the external electronic device, based on the at least one DL and the at least one UL.

According to various embodiments, an electronic device may include a communication circuit configured to support WLAN communication and a processor operatively connected to the communication circuit. According to an embodiment, the processor may establish communication links with the external electronic device through the communication circuit. According to an embodiment, the processor may identify a downlink (DL) signal quality and an uplink (UL) signal quality. According to an embodiment, when it is determined that DL communication with the external electronic device is possible, based on the DL signal quality and UL communication with the external electronic device is impossible, based on the UL signal quality, the processor may perform a function related to improvement of the UL signal quality. According to an embodiment, in a case that it is determined that UL communication with the external electronic device is possible, based on the performance of the function related to the improvement of the UL signal quality, the processor may perform the WLAN communication with the external electronic device.

According to various embodiments, a method of operating an electronic device may include establishing a plurality of links for WLAN communication with an external electronic device. According to an embodiment, the method of operating the electronic device may include identifying a downlink (DL) signal quality and an uplink (UL) signal quality of each of the plurality of links. According to an embodiment, the method of operating the electronic device may include detecting at least one DL satisfying a predetermined first reference signal quality among the plurality of links based on the DL signal quality. According to an embodiment, the method of operating the electronic device may include, in a case that no link satisfying a predetermined second reference signal quality is detected among the plurality of links based on the UL signal quality, performing a function related to improvement of UL signal qualities for the plurality of links. According to an embodiment, the method of operating the electronic device may include detecting at least one UL satisfying the predetermined second reference signal quality, based on the performance of the function related to the improvement of the UL signal quality among the plurality of links. According to an embodiment, the method of operating the electronic device may include performing the WLAN communication with the external electronic device, based on the at least one DL and the at least one UL.

According to an embodiment, the method of operating the electronic device may include establishing communication links with an external electronic device, based on WLAN communication. According to an embodiment, the method of operating the electronic device may include identifying a downlink (DL) signal quality and an uplink (UL) signal quality. According to an embodiment, the method of operating the electronic device may include determining that DL communication with the external electronic device is possible, based on the DL signal quality. According to an embodiment, the method of operating the electronic device may include performing a function related to improvement of the UL signal quality in a case that it is determined UL communication with the external electronic device is impossible, based on the UL signal quality. According to an embodiment, the method of operating the electronic device may include, in a case that it is determined that UL communication with the external electronic device is possible, based on performance of the function related to improvement of the UL signal quality, performing WLAN communication with the external electronic device.

According to various embodiments, a non-transitory computer-readable medium (or computer program product) storing one or more programs is described. According to an embodiment, one or more programs may include instructions for, when executed by a processor of an electronic device, establishing a plurality of links for WLAN communication with an external electronic device, identifying a downlink (DL) signal quality and an uplink (UL) signal quality of each of the plurality of links, detecting at least one DL satisfying a predetermined first reference signal quality among the plurality of links based on the DL signal quality, in a case that no link satisfying a predetermined second reference signal quality is detected among the plurality of links based on the UL signal quality, performing a function related to improvement of UL signal qualities for the plurality of links, detecting at least one UL satisfying the predetermined second reference signal quality, based on the performance of the function related to the improvement of the UL signal quality among the plurality of links, and performing the WLAN communication with the external electronic device, based on the at least one DL and the at least one UL.

According to various embodiments, when there is at least one link for downlink (DL) communication but there is no link for uplink (UL) communication among a plurality of links with an external electronic device (for example, an access point (AP)), the electronic device can improve a quality of WLAN communication by improving a UL signal quality for each link.

According to various embodiments, when a DL signal quality and a UL signal quality with the external electronic device (for example, the AP) are asymmetric, the electronic device can improve the quality of WLAN communication by improving the UL signal quality.

Effects which can be obtained from various embodiments of the disclosure are not limited to the above-mentioned effects, and other effects which have not been mentioned may be clearly understood by those skilled in the art to which various embodiments of the disclosure belong on the basis of the following description.

Hereinafter, various embodiments are described in detail with reference to the accompanying drawings.

Figure 1:
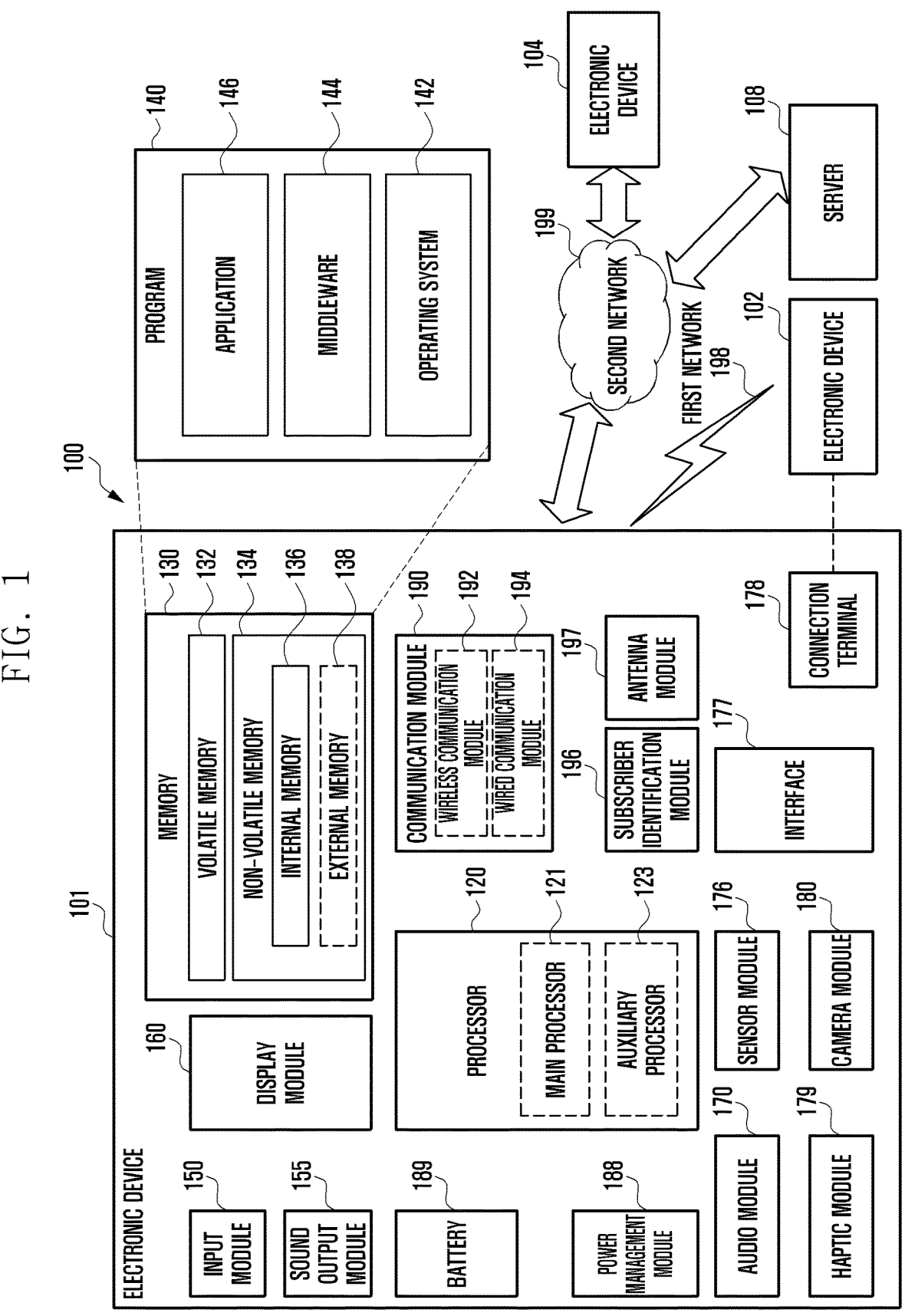
FIG. 1 is a block diagram illustrating an electronic device within a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. According to an embodiment, the subscriber identification module 196 may include a plurality of subscriber identification modules. For example, the plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
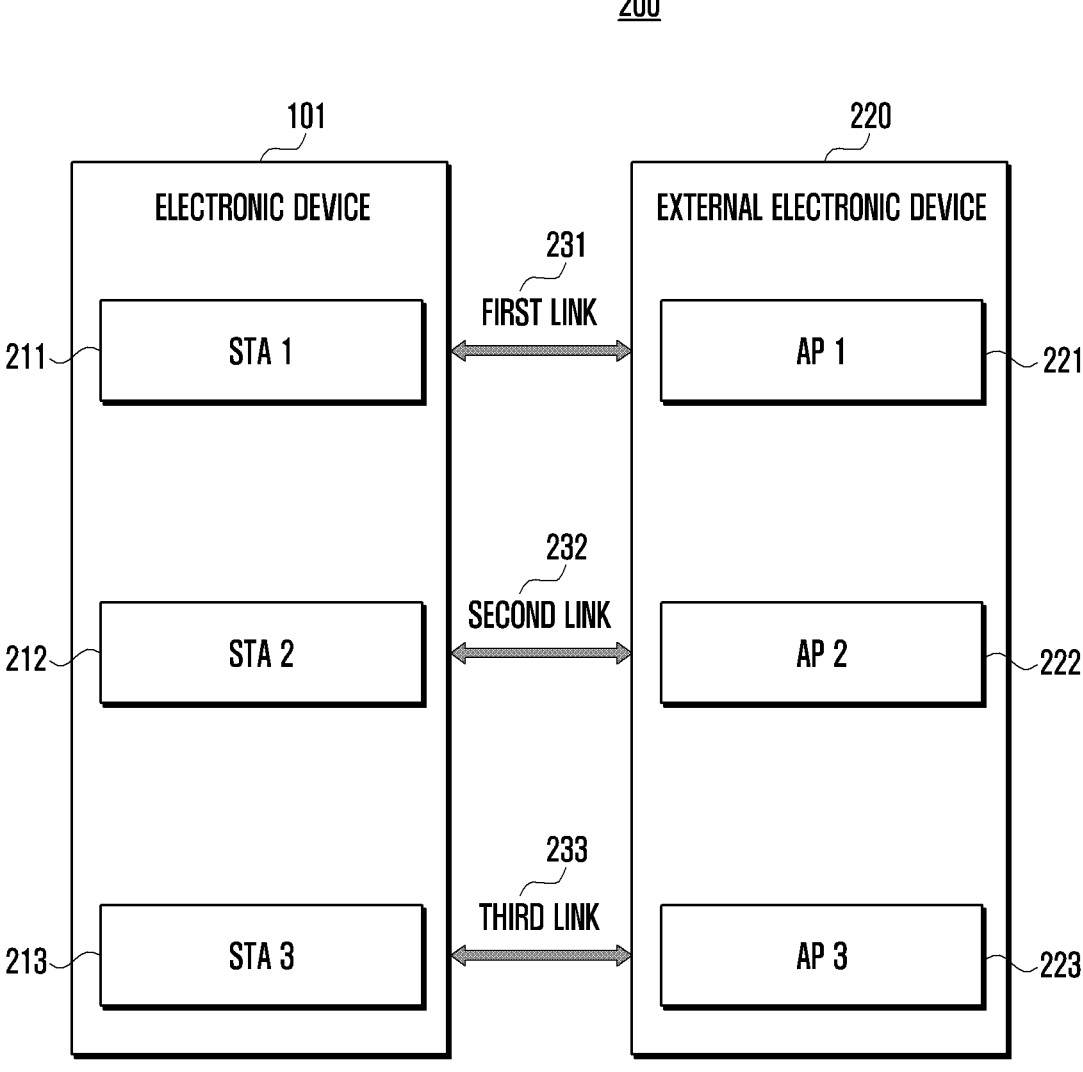
FIG. 2 illustrates an example of a multi-link operation (MLO) in a WLAN system according to various embodiments.

FIG. 2 illustrates an example of a multi-link operation (MLO) in a WLAN system according to various embodiments. For example, the electronic device 101 of FIG. 2 may be at least partially similar to the electronic device 101 of FIG. 1 or may include another embodiment of the electronic device.

According to various embodiments referring to FIG. 2, a WLAN system 200 may include the electronic device 101 and/or an external electronic device 220 (for example, the electronic device 102 of FIG. 1). According to an embodiment, the electronic device 101 may perform WLAN communication with the external electronic device 220. For example, WLAN communication may include Wi-Fi as a communication scheme defined in the IEEE 802.11 standard. For example, the external electronic device 220 may serve as a base station which provides WLAN communication to at least one electronic device 101 located within a communication radius of the WLAN system 200. For example, the external electronic device 220 may include an access point (AP) of IEEE 802.11. For example, the external electronic device 220 may include a plurality of APs (for example, AP #1 221, AP #2 222, and/or AP #3 223) corresponding to a plurality of links (for example, a first link 231, a second link 232, and/or a third link 233) with the electronic device 101. For example, the electronic device 101 may include a station (STA) of IEEE 802.11. For example, the electronic device 101 may include a plurality of STAs (for example, STA #1 211, STA #2 212, and/or STA #3 313) corresponding to the plurality of links (for example, the first link 231, the second link 232, and/or the third link 233) with the electronic device 101.

According to various embodiments, the electronic device 101 and the external electronic device 220 may support the multi-link operation (MLO). The MLO may include a communication scheme for transmitting and/or receiving data (or packets) through the plurality of links (for example, the first link 231, the second link 232, and/or the third link 233). For example, the plurality of links for the MLO may include different media access control (MAC) addresses. For example, the plurality of STAs (for example, STA #1 211, STA #2 212, and/or STA #3 213) included in the electronic device 101 may include different MAC addresses. For example, the electronic device 101 and the external electronic device 220 may perform WLAN communication by using one Internet protocol (IP) address.

According to various embodiments, when the MLO is supported, the electronic device 101 may perform WLAN communication with the external electronic device 220 through each link (for example, the first link 231, the second link 232, and/or the third link 233). According to an embodiment, the electronic device 101 (for example, STA #1 211) may transmit and/or receive data (or packets) to and/or from the external electronic device 220 through the first link 231. For example, data may be transmitted and/or received through a frequency band or channel corresponding to the first link 231. According to an embodiment, the electronic device 101 (for example, STA #2 212) may transmit and/or receive data to and/or from the external electronic device 220 through the second link 232. For example, data may be transmitted and/or received through a frequency band or channel corresponding to the second link 232. According to an embodiment, the electronic device 101 (for example, STA #3 213) may transmit and/or receive data to and/or from the external electronic device 220 through the third link 233. For example, data may be transmitted and/or received through a frequency band or channel corresponding to the third link 233.

According to various embodiments, when the MLO is supported, the external electronic device 220 may perform WLAN communication with the electronic device 101 through each link (for example, the first link 231, the second link 232, and/or the third link 233). According to an embodiment, the external electronic device 220 (for example, AP #1 221) may transmit and/or receive data (or packets) to and/or from the electronic device 101 through the first link 231. According to an embodiment, the external electronic device 220 (for example, AP #2 222) may transmit and/or receive data to and/or from the electronic device 101 through the second link 232. According to an embodiment, the external electronic device 220 (for example, AP #3 223) may transmit and/or receive data to and/or from the electronic device 101 through the second link 233.

According to various embodiments, frequency bands (or channels) of the first link 231, the second link 232, and the third link 233 may be configured to be different. For example, the first link 231 may support a band of about 2.4 GHz, the second link 232 may support a band of about 5 GHz, and the third link 233 may support a band of 6 GHz.

According to various embodiments, the first link 231, the second link 232, and/or the third link 233 may be used by external devices as well as the electronic device 101. For example, the external device may include another electronic device supporting WLAN communication except for the electronic device 101 and the external electronic device 220. According to an embodiment, the electronic device 101 may support a carrier sense multiple access with collision avoidance (CSMA/CA) scheme so that the electronic device 101 and the external device do not influence each other by the simultaneous use of the same link. For example, when the CSMA/CA is supported, the electronic device 101 may identify whether the external device transmits data through a specific link (for example, the first link 231, the second link 232, and/or the third link 233). When it is determined that the external device transmits data through the specific link, the electronic device 101 may restrict transmission of data through the specific link. For example, when it is determined that the external device does not transmit data through the specific link, the electronic device 101 may transmit data through the specific link according to a predetermined scheme. For example, the predetermined scheme may include clear channel assessment (CCA). For example, the first link 231, the second link 232, and/or the third link 233 may independently support CSMA/CA.

Figure 3:
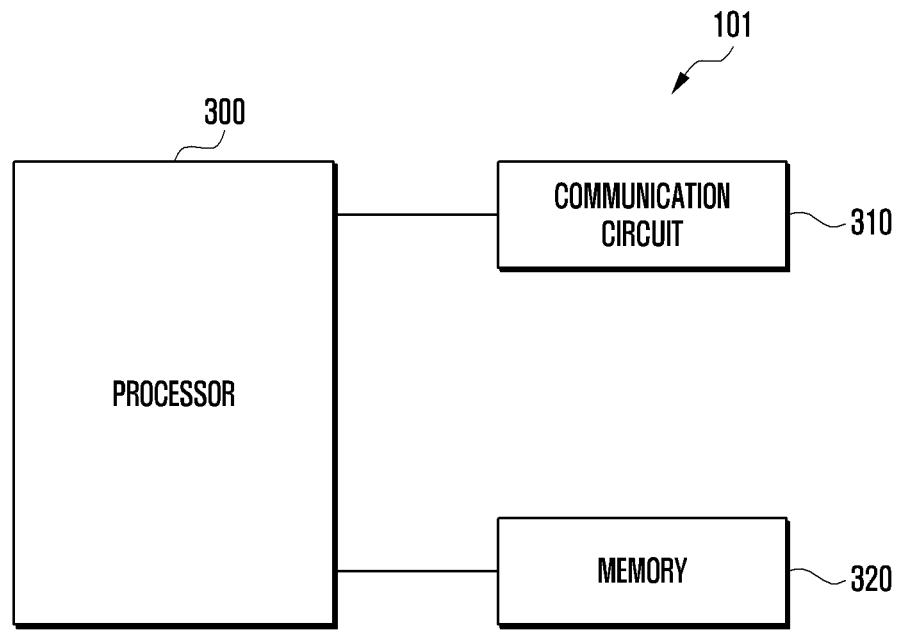
FIG. 3 is a block diagram of an electronic device to improve a UL signal quality according to various embodiments.

FIG. 3 is a block diagram of an electronic device to improve a UL signal quality according to various embodiments. According to an embodiment, the electronic device 101 of FIG. 3 may be at least partially similar to the electronic device 101 of FIG. 1 or FIG. 2 or may include another embodiment of the electronic device.

According to various embodiments referring to FIG. 3, the electronic device 101 may include a processor (e.g., including processing circuitry) 300, a communication circuit 310, and/or a memory 320. According to an embodiment, the processor 300 may be substantially the same as the processor 120 of FIG. 1 (for example, an application processor) or may be included in the processor 120. The communication circuit 310 may be substantially the same as the wireless communication module 192 of FIG. 1 or included in the wireless communication module 192. The memory 320 may be substantially the same as the memory 130 of FIG. 1 or may be included in the memory 130. According to an embodiment, the processor 300 may be operatively, functionally, and/or electrically connected to the communication circuit 310 and/or the memory 320.

According to various embodiments, the processor 300 may control the communication circuit 310 to establish (set up) a plurality of links (for example, the first link 231, the second link 232, and/or the third link 233 of FIG. 2) with an external electronic device (for example, the external electronic device 220 of FIG. 2). According to an embodiment, the processor 300 may control the communication circuit 310 to establish the plurality of links with the external electronic device 220 through at least one link. For example, the processor 300 may acquire information related to the MLO of the external electronic device 220 in a beacon or a probe response frame received through a first frequency band (or the first link 231) from the external electronic device 220. For example, the information related to the MLO may include information related to not only the first frequency band (or the first link 231) receiving the beacon or the probe response frame but also a second frequency band (or the second link 232) and/or a third frequency band (or the third link 233) which can be supported by the external electronic device 220 for the LMO. For example, the information related to the frequency band (or link) may include a basic service set identifier (BSSID) of each frequency band (or link) and/or a parameter related to the MLO. For example, the processor 300 may control the communication circuit 310 to transmit an association request frame related to the plurality of links to the external electronic device 230 through at least one link on the basis of information related to the MLO of the external electronic device 220. For example, the association request frame may include information related to a capability of each link and/or an operational parameter as information related to establishment of the first link 231, the second link 232, and/or the third link 233. For example, when acquiring accept-related information from the external electronic device 220 in response to the association request frame, the processor 300 may determine that the plurality of links with the external electronic device 220 are established. For example, when acquiring information related to reject of at least one of the plurality of links from the external electronic device 220 in response to the association request frame, the processor 300 may determine that establishment of at least one link corresponding the information related to reject has failed among the plurality of links with the external electronic device 220. For example, at least one link corresponding to the information related to reject may be excluded from establishment of the link with the external electronic device 220.

According to an embodiment, the processor 300 may control the communication circuit 310 to establish links corresponding to at least some frequency bands (for example, at least two frequency bands) among a plurality of frequency bands which can be supported by the electronic device 101 and/or the external electronic device 220 for the MLO. For example, the number of links corresponding to at least some frequency bands may be configured on the basis of the number of links which can be simultaneously operated by the electronic device 101 and/or the external electronic device 220.

According to various embodiments, the processor 300 may identify a downlink (DL) signal quality and an uplink (UL) signal quality for each of the plurality of links with the external electronic device 220. According to an embodiment, the processor 300 may identify channel state information (CSI) of each link on the basis of a signal received through each of the plurality of links with the external electronic device 220.

According to an embodiment, when it is determined that the electronic device 101 is located in a non-line of sight (NLOS) environment from the external electronic device 220 on the basis of channel state information of each link, the processor 300 may identify a DL signal quality and a UL signal quality for each link.

According to an embodiment, when it is determined that the electronic device 101 is located in the NLOS environment on the basis of channel state information of at least one link among a plurality of links, the processor 300 may identify a DL signal quality and a UL signal quality for each link. For example, the processor 300 may determine whether the electronic device 101 is located in the NLOS environment on the basis of at least one of a standard deviation of the channel state information, skewness, kurtosis, or Rician k factor. For example, the channel state information may be acquired through channel estimation based on a long training field (LTF) included in a beacon or a preamble of data received from the external electronic device 220.

According to an embodiment, the processor 300 may identify a UL retransmission rate and/or the number of UL failures for each link. For example, when it is determined that the UL retransmission rate for each link is satisfied with a predetermined signal quality identification condition, the processor 300 may identify the DL signal quality and the UL signal quality for each link. For example, when it is determined that a UL retransmission rate of at least one link among the plurality of links is satisfied with the predetermined signal quality identification condition, the processor 300 may identify the DL signal quality and the UL signal quality for each link. For example, the UL retransmission rate may be identified on the basis of the number of transmissions of data from the electronic device 101 to the external electronic device 220 during a predetermined times period, the number of retransmissions of data, and the number of failures of data transmission and/or retransmission. For example, the number of UL failures is the number of failures of data transmission and/or retransmission by the electronic device 101 and may include the number of times a signal (for example, an acknowledgement (ACK) signal) related to completion (success) of reception of data transmitted and/or retransmitted to the external electronic device 220 is not identified. For example, states in which the predetermined signal quality identification condition is satisfied are a state in which the UL retransmission rate is larger than a predetermined reference retransmission rate and/or a state in which the number of UL failures is larger than the predetermined reference number of failures, and may include a state in which it is determined that the UL signal quality is relatively low. For example, states in which the predetermined signal quality identification condition is not satisfied are states in which the UL retransmission rate is equal to or smaller than a predetermined reference retransmission rate and/or states in which the number of UL failures is equal to or smaller than the predetermined reference number of failures, and may include a state in which it is determined that the UL signal quality is relatively high.

According to an embodiment, the processor 300 may identify the DL signal quality of each link. For example, when it is determined that the DL signal quality for each link is satisfied with the predetermined signal quality identification information, the processor 300 may identify the UL signal quality for each link. For example, when it is determined that a DL signal quality of at least one link among the plurality of links is satisfied with the predetermined signal quality identification condition, the processor 300 may identify the UL signal quality for each link. For example, the DL signal quality may be identified (or estimated) on the basis of a signal received from the external electronic device 220. For example, the state in which the predetermined signal quality identification condition is satisfied is a state in which the DL signal quality is equal to or lower than a predetermined reference quality, and may include a state in which it is determined that the DL signal quality is relatively low. For example, the state in which the predetermined signal quality identification condition is not satisfied is a state in which the DL signal quality is higher than a predetermined reference quality, and may include a state in which it is determined that the DL signal quality is relatively high.

According to an embodiment, when a transmission period of a sounding signal (or a reference signal) of the electronic device 101 arrives, the processor 300 may identify a DL signal quality and a UL signal quality for each link. For example, the sounding signal may include a reference signal transmitted by the electronic device 101 in order to identify the UL signal quality.

According to an embodiment, the processor 300 may identify (or estimate) the DL signal quality of each link on the basis of a signal received from the external electronic device 220. For example, the DL signal quality of each link may include at least one of information (for example, standard type) related to the standard of WLAN communication (for example, Wi-Fi), the number of spatial streams allowed by the external electronic device 220, information related to transmission power of the external electronic device 220, the number of spatial streams allowed by the electronic device 101, received signal strength (for example, a received signal strength indicator (RSSI)), a signal to noise ratio (SNR), a reception speed of a link (for example, a link speed), a channel utilization rate (channel utilization), a clear channel assessment (CCA) busy time, or a time during which wireless communication is active (radio on time). For example, the number of spatial streams allowed by the external electronic device 220 may be configured on the basis of antennas (or the number of antennas) included in the external electronic device 220. For example, the information related to transmission power of the external electronic device 220 is acquired from the external electronic device 220 through a beacon frame and may include transmit power control (TPC). For example, the number of spatial streams allowed by the electronic device 101 may be configured on the basis of antennas (or the number of antennas) included in the electronic device 101. For example, the DL signal quality of each link may include DL throughput of each link estimated on the basis of a DL data rate as shown in Equation 1 below.

$$ET_{DL,i} = DR_{DL,i} \times \frac{255 - CU_i}{255} \qquad \text{Equation 1}$$

For example, $ET_{DL,i}$ denotes DL throughput of an $i^{th}$ link, $DR_{DL,i}$ denotes a DL data rate of the $i^{th}$ link, and $CU_i$ denotes a channel utilization rate of the $i^{th}$ link. For example, the channel utilization rate may be replaced with a CCA busy time and the time during which wireless communication is active (radio on time) to measure CCA.

For example, the DL data rate may be identified (or estimated) on the basis of the SNR of each link as shown in Equation 2 below.

$$DataRate = \\ \min(\log_2(1 + SNR_{tone}), MaxBitsPerSc) \times \frac{NSS_{max} \times Ntone}{DSYM_{DUR}} \qquad \text{Equation 2}$$

For example, datarate denotes a data rate of a link, $SNR_{tone}$ denotes an SNR of a subcarrier included in the link, MaxBitsPerSc is the maximum number of bits which can be transmitted through each subcarrier and is configured on the basis of a modulation and coding scheme (MCS) level, $NSS_{max}$ denotes the number of spatial streams, $N_{tone}$ denotes the number of subcarriers, and $DSYM_{DUR}$ denotes symbol duration.

According to an embodiment, the processor 300 may identify (or estimate) a UL signal quality of each link on the basis of a UL signal such as a sounding signal, a domain name system (DNS) query, or a hypertext transfer protocol (HTTP) request. For example, the UL signal quality of each link may include UL throughput of each link estimated on the basis of a UL data rate as shown in Equation 3 below.

$$ET_{UL,i} = DR_{UL,i} \times \frac{255 - CU_i}{255}, \qquad \text{Equation 3}$$

For example, $ET_{UL,i}$ denotes UL throughput of an $i^{th}$ link, $DR_{UL,i}$ denotes a UL data rate of the $i^{th}$ link, and $CU_i$ denotes a channel utilization rate of the $i^{th}$ link. For example, the channel utilization rate may be replaced with a CCA busy time and the time during which wireless communication is active (radio on time) to measure CCA.

According to an embodiment, the processor 300 may identify a DL signal quality and a UL signal quality for a plurality of links established with the external electronic device 220 and at least one link which can be additionally established although no link is established with the external electronic device 220. For example, the processor 300 may identify the DL signal quality and the UL signal quality for each of the plurality of links established with the external electronic device 220. For example, the processor 300 may additionally establish at least one link through association (or re-association) with the external electronic device 220. The processor 300 may identify the DL signal quality and the UL signal quality for at least one additionally established link.

According to various embodiments, the processor 300 may identify whether there is at least one first valid link in the DL among the plurality of links on the basis of the DL signal quality of the plurality of links with the external electronic device 220. According to an embodiment, the processor 300 may identify whether there is at least one first valid link among the plurality of links established with the external electronic device 220 and at least one link (for example, at least one additionally established link) which can be additionally established although no link is established with the external electronic device 220. For example, the first valid link may include a link in which DL throughput is larger than predetermined first reference throughput among the plurality of links.

According to various embodiments, the processor 300 may identify whether there is at least one second valid link in the UL among the plurality of links on the basis of the UL signal quality of the plurality of links with the external electronic device 220. According to an embodiment, the processor 300 may identify whether there is at least one second valid link among the plurality of links established with the external electronic device 220 and at least one link (for example, at least one additionally established link) which can be additionally established although no link is established with the external electronic device 220. For example, the second valid link may include a link in which UL throughput is larger than predetermined second reference throughput among the plurality of links.

According to various embodiments, when there is at least one first valid link in the DL and at least one second valid link in the UL among the plurality of links with the external electronic device 220, the processor 300 may control the communication circuit 310 to perform WLAN communication with the external electronic device 220 through at least one first valid link and at least one second valid link. According to an embodiment, the processor 300 may control the communication circuit 310 to activate at least one first valid link and at least one second valid link through traffic identifier (TID) link mapping (for example, TID to link mapping) or power management. For example, the processor 300 may control the communication circuit 310 to allocate TIDs to be used for at least one first valid link and/or at least one second valid link through TID link mapping. For example, TID allocation may include a series of operations of negotiating TIDs to be used for at least one first valid link and/or at least one second valid link with the external electronic device 220. For example, the processor 300 may control the communication circuit 310 to activate at least one first valid link and/or at least one second valid link through power management. For example, power management for activating the link may include a series of operations for configuring a power management (PM) bit of a "null data frame" as a first value (for example, '0') and transmitting the same to the external electronic device 220.

According to an embodiment, the processor 300 may control the communication circuit 310 to deactivate at least one first inactive link in the DL and/or at least one second inactive link in the UL among the plurality of links with the external electronic device 220 through TID link mapping or power management. For example, the first inactive link may include the remaining DL except for at least one first valid link among the plurality of links with the external electronic device 220. For example, the second inactive link may include the remaining UL except for at least one second valid link among the plurality of links with the external electronic device 220. For example, the processor 300 may control the communication circuit 310 to restrict allocation of TIDs to be used for at least first inactive link and/or at least one second inactive link through TID link mapping. For example, restriction of allocation of TIDs may include a series of operations of releasing mapping of the TIDs allocated to at least first inactive link and/or at least one second inactive link. For example, the processor 300 may control the communication circuit 310 to deactivate at least first inactive link and/or at least one second inactive link through power management. For example, power management for deactivating the link may include a series of operations for configuring a PM bit of a "null data frame" as a second value (for example, '1') and transmitting the same to the external electronic device 220.

According to various embodiments, when there is no first valid link among the plurality of links with the external electronic device 220, the processor 300 may control the communication circuit 310 to move (for example, roaming) to another external electronic device. According to an embodiment, when there is no first valid link among the plurality of links with the external electronic device 220, the processor 300 may identify whether there is another external electronic device (for example, another AP) which the electronic device 101 can access through a scan. According to an embodiment, when there is another external electronic device which the electronic device 101 can access, the processor 300 may control the communication circuit 310 to establish a communication link with the other external electronic device. The processor 300 may control the communication circuit 310 to perform WLAN communication through a communication link with the other external electronic device. According to an embodiment, when there is no other external electronic device which the electronic device 101 can access, the processor 300 may control a separate communication circuit to access a cellular network. For example, the separate communication circuit is a communication circuit different from the communication circuit 310 supporting WLAN communication and may support cellular communication of the electronic device 101.

According to various embodiments, when there is at least one first valid link but there is no second valid link among the plurality of links with the external electronic device 220, the processor 300 may control the communication circuit 310 to perform a function for improving the UL signal quality. For example, the function for improving the UL signal quality may include at least one of application of dual carrier modulation (DCM) to the UL, the use of an extended range physical protocol data unit (PPDU), the use of a multi-link (ML) duplication mode, expansion of a guard interval (GI), or the use of a diversity mode. For example, expansion of the GI may include a series of operations for using a relatively long GI among GIs having different lengths defined in the WLAN standard in order to protect a symbol (for example, an orthogonal frequency division multiplexing (OFDM) symbol) from inter symbol interference (ISI). For example, the use of the extended range PPDU may include a series of operations for repeatedly using a specific field among the fields included in the preamble of packets or amplifying For example, the application of the DCM may include a series of operations for, when OFDM modulation is used, transmitting one data through two separated subcarriers. For example, the use of the ML duplication mode may include a series of operations for transmitting the same data through at least two links among the plurality of links of the external electronic device.

According to an embodiment, the processor 300 may identify whether there is at least one second valid link on the basis of the application of the function for improving the UL signal quality. For example, when at least one second valid link is detected on the basis of the application of the function for improving the UL signal quality, the processor 300 may control the communication circuit 310 to perform WLAN communication with the external electronic device 220 through at least one first valid link and at least one second valid link. For example, the processor 300 may control the communication circuit 310 to move (for example, roaming) to another external electronic device.

According to various embodiments, the processor 300 may identify a DL signal quality and a UL signal quality of a single link (for example, the first link 231, the second link 232, or the third link 233 of FIG. 2) with the external electronic device 220. According to an embodiment, the processor 300 may identify channel state information (CSI) on the basis of a signal received from the external electronic device 220. According to an embodiment, when it is determined that the electronic device 101 is located in the NLOS environment from the external electronic device 220 on the basis of the channel state information, the processor 300 may identify the DL signal quality and the UL signal quality. According to an embodiment, when it is determined that the UL retransmission rate and/or the number of UL failures are satisfied with the predetermined signal quality identification condition, the processor 300 may identify the DL signal quality and the UL signal quality. According to an embodiment, when it is determined that the DL signal quality is satisfied with the predetermined signal quality identification condition, the processor 300 may identify the UL signal quality. According to an embodiment, when a transmission period of a sounding signal arrives, the processor 300 may identify the DL signal quality and the UL signal quality.

According to various embodiments, when it is determined that DL communication with the external electronic device 220 is possible on the basis of the DL signal quality and UL communication with the external electronic device 220 is possible on the basis of the UL signal quality, the processor 300 may control the communication circuit 310 to perform WLAN communication with the external electronic device 220. For example, the state in which DL communication is possible may include a state in which DL throughput is larger than predetermined first reference throughput. For example, the state in which UL communication is possible may include a state in which UL throughput is larger than predetermined second reference throughput.

According to various embodiments, when it is determined that DL communication with the external electronic device 220 is not possible on the basis of the DL signal quality, the processor 300 may control the communication circuit 310 to move (for example, roaming) to another external electronic device. According to an embodiment, when another external electronic device which the electronic device 101 can access is detected through a scan, the processor 300 may control the communication circuit 310 to establish a communication link with the other external electronic device. According to an embodiment, when there is no other external electronic device which the electronic device 101 can access, the processor 300 may control a separate communication circuit to access a cellular network.

According to various embodiments, when it is determined that DL communication with the external electronic device 220 is possible on the basis of the DL signal quality but UL communication with the external electronic device 220 is not possible on the basis of the UL signal quality, the processor 300 may control the communication circuit 310 to perform a function for improving the UL signal quality. For example, the function for improving the UL signal quality may include at least one of the application of a DCM to the UL, the use of an extended range PPDU, the expansion of a GI, or the use of a diversity mode.

According to an embodiment, when it is determined that UL communication with the external electronic device 220 is possible on the basis of the application of the function for improving the UL signal quality, the processor 300 may control the communication circuit 310 to perform WLAN communication with the external electronic device 220. According to an embodiment, when it is determined that UL communication with the external electronic device 220 is not possible, the processor 300 may control the communication circuit 310 to move (for example, roaming) to another external electronic device.

According to various embodiments, the communication circuit 310 may transmit and/or receive data (or packets) to and/or from at least one external electronic device (for example, the external electronic device 220 of FIG. 2) through WLAN communication.

According to various embodiments, the memory 320 may store various pieces of data used by at least one element (for example, the processor 300 and/or the communication circuit 310) of the electronic device 101. For example, the data may include data related to identification of the DL and/or UL signal quality, information related to a method of identifying the DL and/or UL signal quality, and/or information related to the function for improving the UL signal quality. According to an embodiment, the memory 320 may store various instructions which can be executed through the processor 300.

According to various embodiments, the electronic device 101 may identify the downlink (DL) signal quality and uplink (UL) signal quality for each of the plurality of links with the external electronic device 220 through the communication circuit 310.

According to various embodiments, an electronic device (for example, the electronic device 101 of FIG. 1, FIG. 2, or FIG. 3) may include a communication circuit (for example, the wireless communication module 192 of FIG. 1 or the communication circuit 310 of FIG. 3) configured to support WLAN communication, and a processor (for example, the processor 120 of FIG. 1 or the processor 300 of FIG. 3)

operatively connected to the communication circuit. According to an embodiment, the processor may establish a plurality of links (for example, the first link 231, the second link 232, and/or the third link 233 of FIG. 2) with an external electronic device (for example, the electronic device 102 of FIG. 1 or the external electronic device 220 of FIG. 2) through the communication circuit. According to an embodiment, the processor may identify a downlink (DL) signal quality and an uplink (UL) signal quality of each of the plurality of links. According to an embodiment, the processor may detect at least one DL satisfying a predetermined first reference signal quality among the plurality of links based on the DL signal quality. According to an embodiment, in a case that no link satisfying a predetermined second reference signal quality is detected among the plurality of links based on the UL signal quality, the processor may perform a function related to improvement of UL signal qualities for the plurality of links. According to an embodiment, the processor may detect at least one UL satisfying the predetermined second reference signal quality, based on the performance of the function related to the improvement of the UL signal quality among the plurality of links. According to an embodiment, the processor may perform the WLAN communication with the external electronic device, based on the at least one DL and the at least one UL.

According to various embodiments, when no link satisfying the predetermined first reference signal quality is detected in the plurality of links based on the DL signal quality, the processor may perform access to another external electronic device or switching to a cellular network.

According to various embodiments, when no link satisfying the predetermined second reference signal quality is detected among the plurality of links based on the UL signal quality after the performance of the function related to the improvement of the UL signal, the processor may perform access to another external electronic device or switching to a cellular network.

According to various embodiments, the processor may allocate at least one TID to the at least one DL and the at least one UL through TID link mapping (for example, TID to link mapping) and perform the WLAN communication with the external electronic device, based on the at least one DL and the at least one UL to which the at least one TID is allocated.

According to various embodiments, the processor may switch a DL function of at least one remaining DL except for the at least one DL among the plurality of links to an inactive state through the TID link mapping and switch a UL function of at least one remaining UL except for the at least one UL among the plurality of links to an inactive state through the TID link mapping.

According to various embodiments, when a non-line of sight (NLOS) detection condition is satisfied, based on channel state information of at least one link among the plurality of links, the processor may identify a DL signal quality and a UL signal quality of each of the plurality of links.

According to various embodiments, when a UL retransmission rate and/or a number of failures of at least one link among the plurality of links are satisfied with a predetermined signal quality identification condition, the processor may identify the DL signal quality and the UL signal quality of each of the plurality of links.

According to various embodiments, the processor may identify the DL signal quality of each of the plurality of links and, when the DL signal quality of at least one link among the plurality of links is satisfied with a predetermined signal quality identification condition, identify the UL signal quality of each of the plurality of links.

According to various embodiments, an electronic device (for example, the electronic device 101 of FIG. 1, FIG. 2, or FIG. 3) may include a communication circuit (for example, the wireless communication module 192 of FIG. 1 or the communication circuit 310 of FIG. 3) configured to support WLAN communication, and a processor (for example, the processor 120 of FIG. 1 or the processor 300 of FIG. 3) operatively connected to the communication circuit. According to an embodiment, the processor may establish communication links (for example, the first link 231, the second link 232, or the third link 233 of FIG. 2) with an external electronic device (for example, the electronic device 102 of FIG. 1 or the external electronic device 220 of FIG. 2) through the communication circuit. According to an embodiment, the processor may identify a downlink (DL) signal quality and an uplink (UL) signal quality. According to an embodiment, when it is determined that DL communication with the external electronic device is possible, based on the DL signal quality and UL communication with the external electronic device is impossible, based on the UL signal quality, the processor may perform a function related to improvement of the UL signal quality. According to an embodiment, in a case that it is determined that UL communication with the external electronic device is possible, based on the performance of the function related to the improvement of the UL signal quality, the processor may perform the WLAN communication with the external electronic device.

Figure 4:
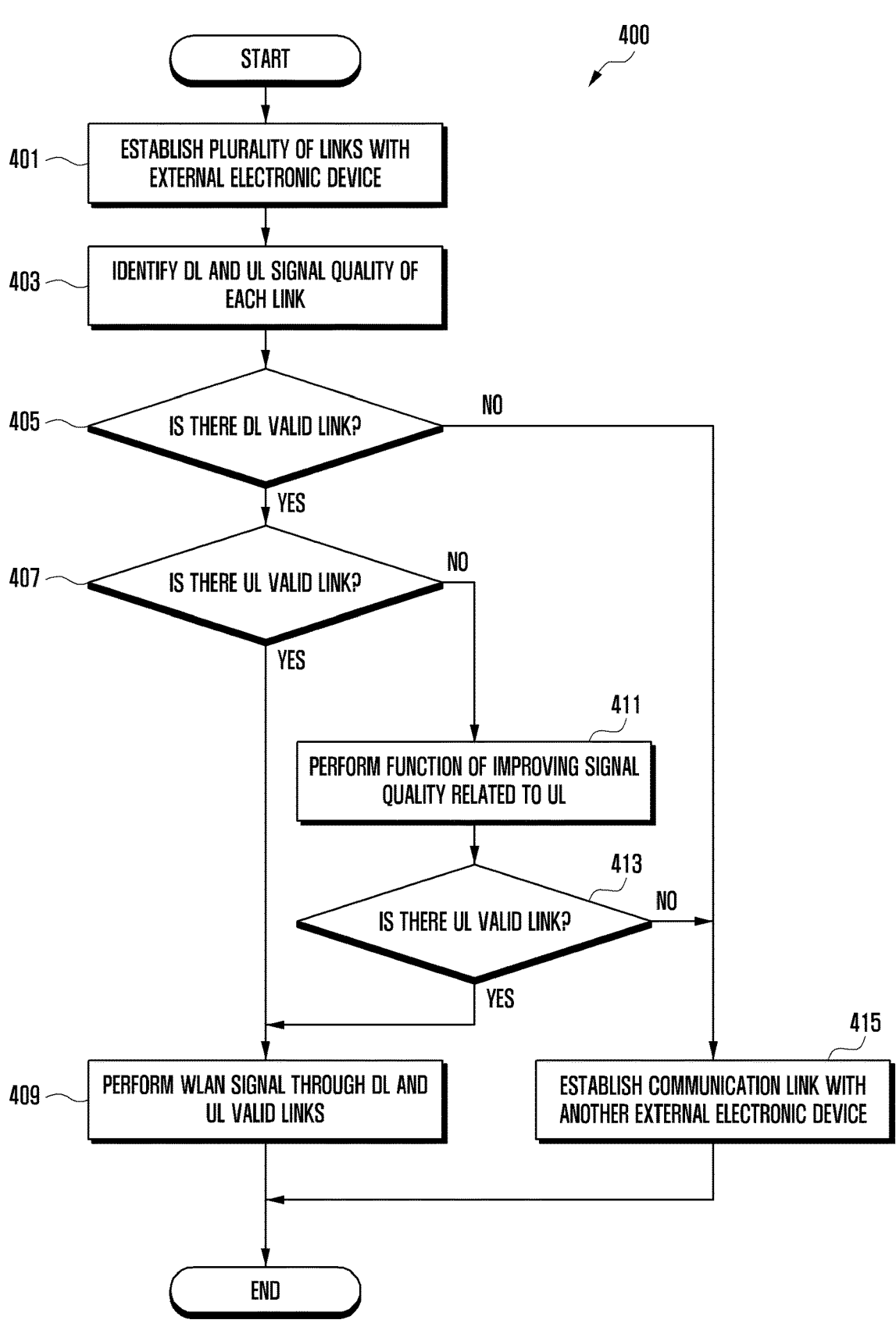
FIG. 4 is a flowchart illustrating a process in which an electronic device in an MLO environment improves a UL signal quality according to various embodiments.

FIG. 4 is a flowchart 400 illustrating a process in which an electronic device in an MLO environment improves a UL signal quality according to various embodiments. In the following embodiments, respective operations may be sequentially performed but the sequential performance is not necessary. For example, orders of the operations may be changed, and at least two operations may be performed in parallel. For example, the electronic device of FIG. 4 may be the electronic device 101 of FIG. 1, 2, or 3.

According to various embodiments referring to FIG. 4, an electronic device (for example, the electronic device 101 of FIG. 1, FIG. 2, or FIG. 3) or a processor (for example, the processor 120 of FIG. 1 or the processor 300 of FIG. 3) may establish (set up) a plurality of links (for example, the first link 231, the second link 232, and/or the third link 233 of FIG. 2) with an external electronic device (for example, the external electronic device 220 of FIG. 2) in operation 401. According to an embodiment, the processor 300 may establish a plurality of links with the external electronic device 220 through at least one frequency band (or link) among a plurality of frequency bands supported by the electronic device 101. For example, the processor 300 may acquire information related to links (for example, a first frequency band (or the first link 231, a second frequency band (or the second link 232), and/or a third frequency band (or the third link 233)) which can be supported by the external electronic device 220 for the MLO in a beacon or a probe response frame received from the external electronic device 220 through at least one frequency band (for example, the first band (or the first link 231)). For example, the information related to the link may include a BSSID of each link (or frequency band) and/or a parameter related to the MLO. According to an embodiment, the processor 300 may control the WLAN communication circuit 310 to transmit an association request frame related to the plurality of links to the external electronic device 220 through at least one link among the links which can be supported by the external electronic device 220 for the MLO. For example, the association request frame is information related to establishment of the first link 231, the second link 232, and/or the third link 233 and may include information related to a function (capability) and/or an operational parameter of each link. For example, when acquiring accept-related information from the external electronic device 220 in response to the association request frame, the processor 300 may determine that the plurality of links with the external electronic device 220 are established. For example, when acquiring information related to reject of at least one of the plurality of links from the external electronic device 220 in response to the association request frame, the processor 300 may determine that establishment of at least one link corresponding the information related to reject has failed among the plurality of links with the external electronic device 220.

According to an embodiment, the processor 300 may control the communication circuit 310 to establish links corresponding to at least some frequency bands (for example, at least two frequency bands) among a plurality of frequency bands which can be supported by the electronic device 101 and/or the external electronic device 220 for the MLO. For example, the number of links corresponding to at least some frequency bands may be configured on the basis of the number of links which can be simultaneously operated by the electronic device 101 and/or the external electronic device 220.

According to various embodiments, the electronic device (for example, the electronic device 101) or the processor (for example, the processor 120 or 300) may identify the DL signal quality and the UL signal quality for each of the plurality of links with the external electronic device 220 in operation 403. According to an embodiment, when it is determined that the electronic device 101 is located in the NLOS environment from the external electronic device 220 on the basis of channel state information (CSI) of each of the plurality of links with the external electronic device 220, the processor 300 may identify the DL signal quality and the UL signal quality for each link. According to an embodiment, when it is determined that the UL retransmission rate and/or the number of UL failures of at least one link among the plurality of links with the external electronic device 220 are satisfied with the predetermined signal quality identification condition, the processor 300 may identify the DL signal quality and the UL signal quality for each link. According to an embodiment, when it is determined that the DL signal quality of at least one link among the plurality of links with the external electronic device 220 is satisfied with the predetermined signal quality identification condition, the processor 300 may identify the UL signal quality for each link. According to an embodiment, when a transmission period of a sounding signal arrives, the processor 300 may identify the DL signal quality and the UL signal quality for each link.

According to an embodiment, the processor 300 may identify (or estimate) the DL signal quality of each link on the basis of a signal received from the external electronic device 220. For example, the DL signal quality of each link may include at least one of information (for example, standard type) related to the standard of WLAN communication (for example, Wi-Fi), the number of spatial streams allowed by the external electronic device 220, information related to transmission power of the external electronic device 220, the number of spatial streams allowed by the electronic device 101, received signal strength (for example, a received signal strength indicator (RSSI)), a signal to noise ratio (SNR), a reception speed of a link (for example, a link speed), a channel utilization rate (channel utilization), a clear channel assessment (CCA) busy time, or a wireless communication active time (ratio on time). For example, the number of spatial streams allowed by the external electronic device 220 may be configured on the basis of antennas (or the number of antennas) included in the external electronic device 220. For example, the information related to transmission power of the external electronic device 220 is acquired from the external electronic device 220 through a beacon frame and may include transmit power control (TPC). For example, the DL signal quality of each link may include DL throughput of each link estimated on the basis of the DL data rate as shown in [Equation 1].

According to an embodiment, when there is no traffic, the processor 300 may identify (or estimate) the UL signal quality of each link on the basis of a UL signal such as a sounding signal, a domain name system (DNS) query, or a hypertext transfer protocol (HTTP) request. For example, the UL signal quality of each link may include UL throughput of each link estimated on the basis of a UL data rate as shown in [Equation 3] below.

According to an embodiment, the processor 300 may identify a DL signal quality and a UL signal quality for a plurality of links established with the external electronic device 220 and at least one link which is not established with the external electronic device 22 but can be additionally established. For example, the processor 300 may identify the DL signal quality and the UL signal quality for each of the plurality of links established with the external electronic device 220. For example, the processor 300 may additionally establish at least one link through association (or re-association) with the external electronic device 220. The processor 300 may identify the DL signal quality and the UL signal quality for at least one additionally established link.

According to various embodiments, the electronic device (for example, the electronic device 101) or the processor (for example, the processor 120 or 130) may identify whether there is at least one first valid link in the DL among the plurality of links on the basis of the DL signal quality of the plurality of links with the external electronic device 220 in operation 405. According to an embodiment, the processor 300 may identify whether there is at least one first valid link among the plurality of links established with the external electronic device 220 and at least one link (for example, at least one additionally established link) which can be additionally established although no link is established with the external electronic device 220. For example, the first valid link may include a link in which DL throughput is larger than predetermined first reference throughput among the plurality of links. For example, the predetermined first reference throughput may include information related to a reference for determining the first valid link among the plurality of links.

According to various embodiments, when there is at least one first valid link (for example, 'Yes' in operation 405), the electronic device (for example, the electronic device 101) or the processor (for example, the processor 120 or 300) may identify whether there is at least one second valid link in the UL among the plurality of links on the basis of the UL signal quality of the plurality of links with the external electronic device 220 in operation 407. According to an embodiment, the processor 300 may identify whether there is at least one second valid link among the plurality of links established with the external electronic device 220 and at least one link (for example, at least one additionally established link) which can be additionally established although no link is established with the external electronic device 220. For example, the second valid link may include a link in which UL throughput is larger than predetermined second reference throughput among the plurality of links. For example, the predetermined second predetermined throughput is a reference for determining the second valid link among the plurality of links and may be the same as or different from the predetermined first reference throughput.

According to various embodiments, when there is at least one second valid link (for example, 'Yes' in operation 407), the electronic device (for example, the electronic device 101) or the processor (for example, the processor 120 or 300) may perform WLAN communication with the external electronic device 220 through at least one first valid link and at least one second valid link in operation 409. According to an embodiment, the processor 300 may control the communication circuit 310 to activate at least one first valid link and at least one second valid link through traffic identifier (TID) link mapping (for example, TID to link mapping) or power management. The processor 300 may control the communication circuit 310 to perform WLAN communication through at least one activated first valid link and at least one activated second valid link. For example, the processor 300 may control the communication circuit 310 to allocate TIDs to be used for at least one first valid link and/or at least one second valid link through TID link mapping. For example, TID allocation may include a series of operations of negotiating TIDs to be used for at least one first valid link and/or at least one second valid link with the external electronic device 220. For example, the processor 300 may control the communication circuit 310 to activate at least one first valid link and/or at least one second valid link through power management. For example, power management for activating the link may include a series of operations for configuring a power management (PM) bit of a "null data frame" as a first value (for example, '0') and transmitting the same to the external electronic device 220.

According to an embodiment, the processor 300 may control the communication circuit 310 to deactivate at least one first inactive link in the DL and/or at least one second inactive link in the UL among the plurality of links with the external electronic device 220 through TID link mapping or power management. For example, the first inactive link may include the remaining DL except for at least one first valid link among the plurality of links with the external electronic device 220. For example, the second inactive link may include the remaining UL except for at least one second valid link among the plurality of links with the external electronic device 220. For example, the processor 300 may control the communication circuit 310 to restrict allocation of TIDs to be used for at least first inactive link and/or at least one second inactive link through TID link mapping. For example, restriction of allocation of TIDs may include a series of operations of releasing mapping of the TIDs allocated to at least first inactive link and/or at least one second inactive link. For example, the processor 300 may control the communication circuit 310 to deactivate at least first inactive link and/or at least one second inactive link through power management. For example, power management for deactivating the link may include a series of operations for configuring a PM bit of a "null data frame" as a second value (for example, '1') and transmitting the same to the external electronic device 220.

According to various embodiments, when there is not at least one second valid link (for example, 'No' in operation 407), the electronic device (for example, the electronic device 101) or the processor (for example, the processor 120 or 300) may perform the function for improving the UL signal quality in operation 411. For example, the function for improving the UL signal quality may include at least one of application of dual carrier modulation (DCM) to the UL, the use of an extended range physical protocol data unit (PPDU), the use of a multi-link (ML) duplication mode, expansion of a guard interval (GI), or the use of a diversity mode. For example, expansion of the GI may include a series of operations for using a relatively long GI among GIs having different lengths defined in the WLAN standard in order to protect a symbol (for example, an orthogonal frequency division multiplexing (OFDM) symbol) from inter symbol interference (ISI). For example, the use of the extended range PPDU may include a series of operations for repeatedly using a specific field among the fields included in the preamble of packets or amplifying For example, the application of the DCM may include a series of operations for, when OFDM modulation is used, transmitting one data through two separated subcarriers. For example, the use of the ML duplication mode may include a series of operations for transmitting the same data through at least two links among the plurality of links of the external electronic device.

According to various embodiments, the electronic device (for example, the electronic device 101) or the processor (for example, the processor 120 or 300) may identify whether there is at least one second valid link on the basis of the application of the function for improving the UL signal quality in operation 413.

According to various embodiments, when there is at least one second valid link (for example, 'Yes' in operation 413), the electronic device (for example, the electronic device 101) or the processor (for example, the processor 120 or 300) may perform WLAN communication with the external electronic device 220 through at least one first valid link and at least one second valid link in operation 409.

When there is no at least one valid link (for example, 'No' in operation 405) or when there is no at least one second valid link (for example, 'No' in operation 413), the electronic device (for example, the electronic device 101) or the processor (for example, the processor 120 or 300) may perform WLAN communication through another external electronic device in operation 415. According to an embodiment, when there is no first valid link among the plurality of links with the external electronic device 220 (for example, 'No' in operation 405), the processor 300 may control the communication circuit 310 to move (for example, roaming) to the other external electronic device. According to an embodiment, when the function for improving the UL signal quality is applied but there is not at least one second valid link (for example, 'No' in operation 413), the processor 300 may control the communication circuit 310 to move (for example, roaming) to the other external electronic device. According to an embodiment, the processor 300 may control the communication circuit 310 to identify whether there is another external electronic device (for example, another AP) which the electronic device 101 can access through a scan. For example, when another external electronic device which the electronic device 101 can access is detected through the scan, the processor 300 may control the communication circuit 310 to establish a communication link with the other electronic device. The processor 300 may control the communication circuit 310 to perform WLAN communication through a communication link with the other external electronic device.

According to various embodiments, when no other external electronic device which the electronic device 101 can access is detected through the scan, the electronic device 101 may determine that WLAN communication cannot be pro-vided. The electronic device 101 may perform cellular communication on the basis of determination that WLAN communication cannot be provided.

Figure 5:
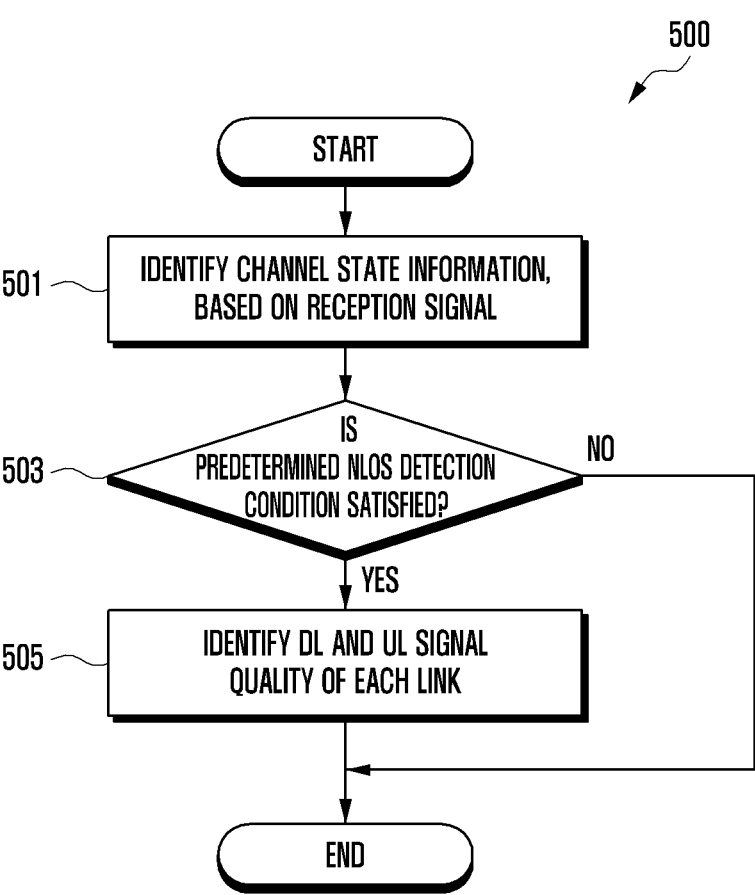
FIG. 5 is a flowchart illustrating a process in which an electronic device identifies a DL and UL signal quality in an NLOS environment according to various embodiments.

FIG. 5 is a flowchart 500 illustrating a process in which the electronic device identifies a DL and UL signal quality in an NLOS environment according to various embodiments. According to an embodiment, at least some of FIG. 5 may include the detailed operation of operation 403 of FIG. 4. In the following embodiments, respective operations may be sequentially performed but the sequential performance is not necessary. For example, orders of the operations may be changed, and at least two operations may be performed in parallel. For example, the electronic device of FIG. 5 may be the electronic device 101 of FIG. 1, 2, or 3.

According to various embodiments referring to FIG. 5, when establishing (setting up) a plurality of links (for example, the first link 231, the second link 232, and/or the third link 233 of FIG. 2) with an external electronic device (for example, the external electronic device 220 of FIG. 2), the electronic device (for example, the electronic device 101 of FIG. 1, FIG. 2, or FIG. 3) or the processor (for example, the processor 120 of FIG. 1 or the processor 300 of FIG. 3) may identify channel state information (CSI) of each link on the basis of a signal received through each of the plurality of links with the external electronic device 220 in operation 501. According to an embodiment, the processor 300 may identify (or estimate) channel state information of each link through channel estimation based on a long training field (LTF) included in a beacon or a preamble of data received from the external electronic device 220 through each link.

According to various embodiments, the electronic device (for example, the electronic device 101) or the processor (for example, the processor 120 or 300) may identify whether a predetermined non-line of sight (NLOS) detection condition is satisfied on the basis of channel state information of each link in operation 503. According to an embodiment, when a standard deviation of channel state information of at least one link is larger than a predetermined reference standard deviation, the processor 300 may determine that the predetermined NLOS detection condition is satisfied. According to an embodiment, when a skewness value based on channel state information of at least one link is larger than a predetermined reference skewness value, the processor 300 may determine that the predetermined NLOS detection condition is satisfied. According to an embodiment, when a kurtosis value based on channel state information of at least one link is equal to or smaller than a predetermined reference kurtosis value, the processor 300 may determine that the predetermined NLOS detection condition is satisfied. According to an embodiment, when a Rician k factor value based on channel state information of at least one link is equal to or smaller than a predetermined reference factor value, the processor 300 may determine that the predetermined NLOS detection condition is satisfied. For example, the state in which the predetermined NLOS detection condition is satisfied may include a state in which it is determined that the electronic device 101 is located in the NLOS environment.

According to various embodiments, when it is determined that the predetermined NLOS detection condition is not satisfied (for example, 'No' in operation 503), the electronic device (for example, the electronic device 101) or the processor (for example, the processor 120 or 300) may end an embodiment for identifying the DL and UL signal quality in the NLOS environment. According to an embodiment, when it is determined that the predetermined NLOS detection condition is not satisfied on the basis of channel state information of each link, the processor 300 may determine that the electronic device 101 is located in a line of sight (LOS) environment from the external electronic device 220. When the electronic device 101 is located in the LOS environment, the processor 300 may determine that there is no difference between the DL signal quality and the UL signal quality. For example, the state in which there is no difference between the DL signal quality and the UL signal quality is a state in which the difference between the DL signal quality and the UL signal quality is equal to or smaller than a predetermined size and may include a state in which the difference between the DL signal quality and the UL signal quality can be ignored.

When it is determined that the predetermined NLOS detection condition is satisfied (for example, 'Yes' in operation 503), the electronic device (for example, the electronic device 101) or the processor (for example, the processor 120 or 300) may identify the DL signal quality and the UL signal quality for each of the plurality of links with the external electronic device 220 in operation 505. For example, the DL signal quality may be identified (or estimated) on the basis of a signal received from the external electronic device 220. For example, the UL signal quality may be identified (or estimated) on the basis of a UL signal such as a sounding signal, a domain name system (DNS) query, or a hypertext transfer protocol (HTTP) request.

Figure 6:
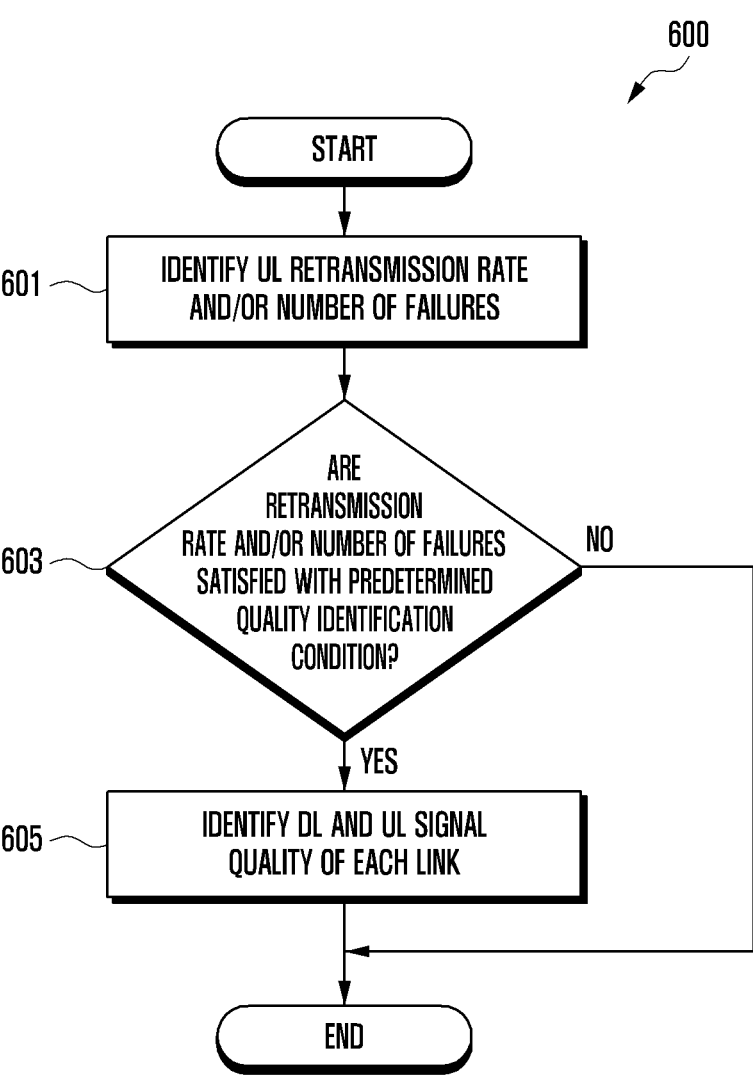
FIG. 6 is a flowchart illustrating a processor in which an electronic device identifies a DL and UL signal quality based on a UL retransmission rate according to various embodiments.

FIG. 6 is a flowchart 600 illustrating a process in which an electronic device identifies a DL and UL signal quality on the basis of a UL retransmission rate according to various embodiments. According to an embodiment, at least some of FIG. 6 may include the detailed operation of operation 403 of FIG. 4. In the following embodiments, respective operations may be sequentially performed but the sequential performance is not necessary. For example, orders of the operations may be changed, and at least two operations may be performed in parallel. For example, the electronic device of FIG. 6 may be the electronic device 101 of FIG. 1, 2, or 3.

According to various embodiments referring to FIG. 6, when establishing (setting up) a plurality of links (for example, the first link 231, the second link 232, and/or the third link 233 of FIG. 2) with an external electronic device (for example, the external electronic device 220 of FIG. 2) (for example, operation 401 of FIG. 4), an electronic device (for example, the electronic device 101 of FIG. 1, FIG. 2, of FIG. 3) or a processor (for example, the processor 120 of FIG. 1 or the processor 300 of FIG. 3) may identify a UL retransmission rate and/or the number of UL failures for each of the plurality of links with the external electronic device 220 in operation 601. For example, the UL retransmission rate may be identified on the basis of the number of transmissions of data from the electronic device 101 to the external electronic device 220 during a predetermined times period, the number of retransmissions of data, and the number of failures of data transmission and/or retransmission. For example, the number of UL failures is the number of failures of data transmission and/or retransmission by the electronic device 101 and may include the number of times a signal (for example, an ACK signal) related to completion (success) of reception of data transmitted and/or retransmitted to the external electronic device 220 is not identified.

According to various embodiments, the electronic device (for example, the electronic device 101) or the processor (for example, the processor 120 or 300) may identify a predetermined signal quality identification condition on the basis of the UL retransmission rate and/or the number of UL failures of each link in operation 603. According to an embodiment, when a UL retransmission rate of at least one link among the plurality of links with the external electronic device 220 is larger than a predetermined reference retransmission rate, the processor 300 may determine that the predetermined signal quality identification condition is satisfied. According to an embodiment, when a UL retransmission rate of each of the plurality of links with the external electronic device 220 is equal to or smaller than a predetermined reference retransmission rate, the processor 300 may determine that the predetermined signal quality identification condition is not satisfied.

According to an embodiment, when the number of UL failures of at least one link among the plurality of links with the external electronic device 220 is larger than a predetermined reference number of failures, the processor 300 may determine that the predetermined signal quality identification condition is satisfied. According to an embodiment, when the number of UL failures of at least one link among the plurality of links with the external electronic device 220 is equal to or smaller than a predetermined reference number of failures, the processor 300 may determine that the predetermined signal quality identification condition is not satisfied.

According to various embodiments, when it is determined that the predetermined signal quality detection condition is not satisfied (for example, 'No' in operation 603), the electronic device (for example, the electronic device 101) or the processor (for example, the processor 120 or 300) may end an embodiment for identifying the DL and UL signal quality on the basis of the UL retransmission rate. According to an embodiment, when there is no link in which the UL retransmission rate is larger than a predetermined reference retransmission rate among the plurality of links with the external electronic device 220, the processor 300 may determine that the UL signal quality of the plurality of links with the external electronic device 220 is relatively high. The processor 300 may determine that improvement of the UL signal quality is not needed on the basis of determination that the UL signal quality of the plurality of links with the external device 220 is relatively high.

According to various embodiments, when it is determined that the predetermined signal quality detection condition is satisfied (for example, 'Yes' in operation 603), the electronic device (for example, the electronic device 101) or the processor (for example, the processor 120 or 300) may identify the DL signal quality and the UL signal quality for each of the plurality of links with the external electronic device 220 in operation 605. For example, the DL signal quality may be identified (or estimated) on the basis of a signal received from the external electronic device 220. For example, the UL signal quality may be identified (or estimated) on the basis of a UL signal such as a sounding signal, a domain name system (DNS) query, or a hypertext transfer protocol (HTTP) request.

Figure 7:
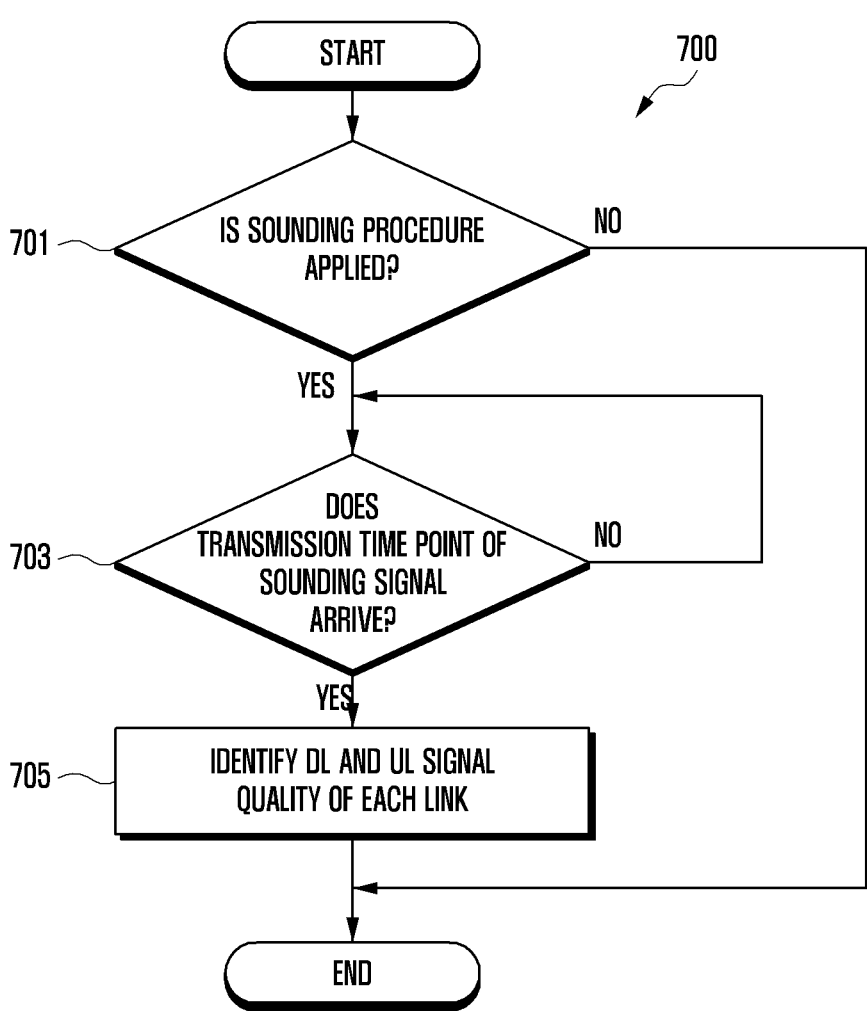
FIG. 7 is a flowchart illustrating a process in which an electronic device identifies a DL and UL signal quality based on a sounding signal according to various embodiments.

FIG. 7 is a flowchart 700 illustrating a process in which an electronic device identifies a DL and UL signal quality on the basis of a sounding signal according to various embodiments. According to an embodiment, at least some of FIG. 7 may include the detailed operation of operation 403 of FIG. 4. In the following embodiments, respective operations may be sequentially performed but the sequential performance is not necessary. For example, orders of the operations may be changed, and at least two operations may be performed in parallel. For example, the electronic device of FIG. 7 may be the electronic device 101 of FIG. 1, 2, or 3.

According to various embodiments referring to FIG. 7, when a plurality of links (for example, the first link 231, the second link 232, and/or the third link 233 of FIG. 2) with an external electronic device (for example, the external electronic device 220) are established (set up) (for example, operation 401 of FIG. 4), an electronic device (for example, the electronic device 101 of FIG. 1, FIG. 2, or FIG. 3) or a processor (for example, the processor 120 of FIG. 1 or the processor 300 of FIG. 3) may identify whether a sounding procedure can be provided in operation 701. According to an embodiment, the processor 300 may identify whether the external electronic device 220 supports a beamforming function on the basis of a capability of the external electronic device 220. When it is determined that the external electronic device 220 supports the beamforming function, the processor 300 may control the communication circuit 310 to perform the sounding procedure.

According to various embodiments, when the sounding procedure cannot be provided (for example, 'No' in operation 701), the electronic device (for example, the electronic device 101) or the processor (for example, the processor 120 or 300) may end an embodiment for identifying the DL and UL signal quality on the basis of the sounding procedure.

According to various embodiments, when the sounding procedure can be provided (for example, 'Yes' in operation 701), the electronic device (for example, the electronic device 101) or the processor (for example, the processor 120 or 300) may identify whether a transmission time point (or period) of the sounding signal arrives in operation 703. According to an embodiment, when the transmission time point (or period) of the sounding signal does not arrive ('No' in operation 703), the processor 300 may identify again whether the transmission time point (or period) of the sounding signal arrives.

According to various embodiments, when the transmission time point (or period) of the sounding signal arrives (Yes' in operation 703), the electronic device (for example, the electronic device 101) or the processor (for example, the processor 120 or 300) may identify the DL signal quality and the UL signal quality for each of the plurality of links with the external electronic device 220 on the basis of the sounding signal in operation 705. According to an embodiment, when a transmission time point (or period) of the sounding signal arrives, the processor 300 may control the communication circuit 310 to transmit a null data packet announcement (NDPA) and/or a null data packet (NDP) to the external electronic device 220. The processor 300 may identify information related to the UL signal quality of each link in a beamforming report field of a CSI feedback frame received from the external electronic device 220 through the communication circuit 310. For example, the information related to the UL signal quality of each link may include an SNR for each stream measured (or estimated) by the AP. According to an embodiment, the processor 300 may identify (or estimate) the DL signal quality of each link on the basis of a signal of each link received from the external electronic device 220 through the communication circuit 310.

Figure 8:
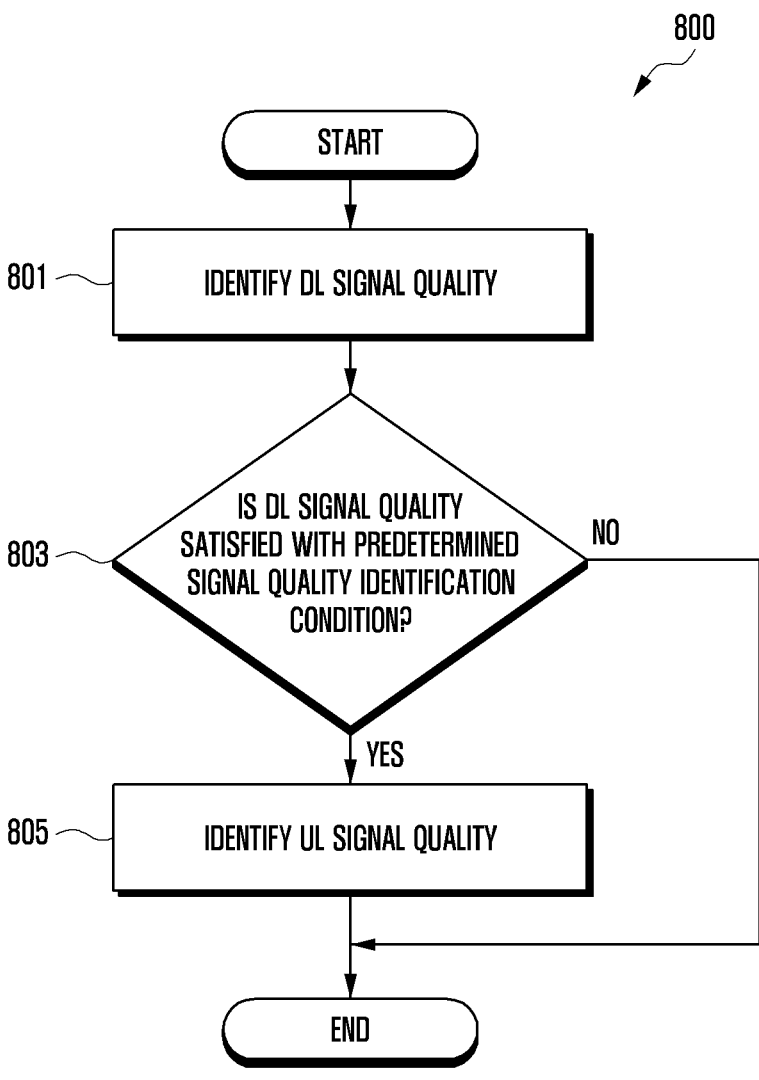
FIG. 8 is a flowchart illustrating a process in which an electronic device identifies a DL and UL signal quality according to various embodiments.

FIG. 8 is a flowchart 800 illustrating a process in which an electronic device identifies a DL and UL Signal quality according to various embodiments. According to an embodiment, at least some of FIG. 8 may include the detailed operation of operation 403 of FIG. 4. In the following embodiments, respective operations may be sequentially performed but the sequential performance is not necessary. For example, orders of the operations may be changed, and at least two operations may be performed in parallel. For example, the electronic device of FIG. 8 may be the electronic device 101 of FIG. 1, 2, or 3.

According to various embodiments referring to FIG. 8, when a plurality of links (for example, the first link 231, the second link 232, and/or the third link 233 of FIG. 2) with an external electronic device (for example, the external electronic device 220) are established (set up) (for example, operation 401 of FIG. 4), an electronic device (for example, the electronic device 101 of FIG. 1, FIG. 2, or FIG. 3) or a processor (for example, the processor 120 of FIG. 1 or the processor 300 of FIG. 3) may identify whether a DL signal quality of each of the plurality of links with the external electronic device 220 in operation 801. According to an embodiment, the processor 300 may identify (or estimate) the DL signal quality of each link on the basis of a signal received from the external electronic device 220. For example, the DL signal quality of each link may include at least one of information (for example, standard type) related to the standard of WLAN communication (for example, Wi-Fi), the number of spatial streams allowed by the external electronic device 220, information related to transmission power of the external electronic device 220, the number of spatial streams allowed by the electronic device 101, received signal strength (for example, a received signal strength indicator (RSSI)), a signal to noise ratio (SNR), a reception speed of a link (for example, a link speed), a channel utilization rate (channel utilization), a clear channel assessment (CCA) busy time, or a wireless communication active time (ratio on time). For example, the number of spatial streams allowed by the external electronic device 220 may be configured on the basis of antennas (or the number of antennas) included in the external electronic device 220. For example, the information related to transmission power of the external electronic device 220 is acquired from the external electronic device 220 through a beacon frame and may include transmit power control (TPC). For example, the number of spatial streams allowed by the electronic device 101 may be configured on the basis of antennas (or the number of antennas) included in the electronic device 101. For example, the DL signal quality of each link may include DL throughput of each link estimated on the basis of the DL data rate as shown in [Equation 1].

According to various embodiments, the electronic device (for example, the electronic device 101) or the processor (for example, the processor 120 or 300) may identify whether a predetermined signal quality identification condition is satisfied on the basis of the DL signal quality of each link in operation 803. According to an embodiment, when the DL signal quality of at least one link among the plurality of links with the external electronic device 220 is equal to or lower than a predetermined reference quality, the processor 300 may determine that the predetermined signal quality identification condition is satisfied. According to an embodiment, when the DL signal quality of each of the plurality of links with the external electronic device 200 is higher than the predetermined reference quality, the processor 300 may determine that the predetermined signal quality identification condition is not satisfied.

According to various embodiments, when it is determined that the predetermined signal quality detection condition is not satisfied (for example, 'No' in operation 803), the electronic device (for example, the electronic device 101) or the processor (for example, the processor 120 or 300) may end an embodiment for identifying the DL and UL signal quality on the basis of the DL signal quality. According to an embodiment, when there is no link having the DL signal quality equal to or lower than the predetermined reference quality among the plurality of links with the external electronic device 220, the processor 300 may determine that the DL signal quality and the UL signal quality of the plurality of links with the external electronic device 220 are relatively high. The processor 300 may determine that improvement of the UL signal quality is not needed on the basis of determination that the UL signal quality of the plurality of links is relatively high.

According to various embodiments, when it is determined that the predetermined signal quality detection condition is satisfied (for example, 'Yes' in operation 803), the electronic device (for example, the electronic device 101) or the processor (for example, the processor 120 or 300) may identify the UL signal quality for each of the plurality of links with the external electronic device 220 in operation 805. For example, the UL signal quality may be identified (or estimated) on the basis of a sounding signal, a domain name system (DNS) query, or a hypertext transfer protocol (HTTP) request.

Figure 9:
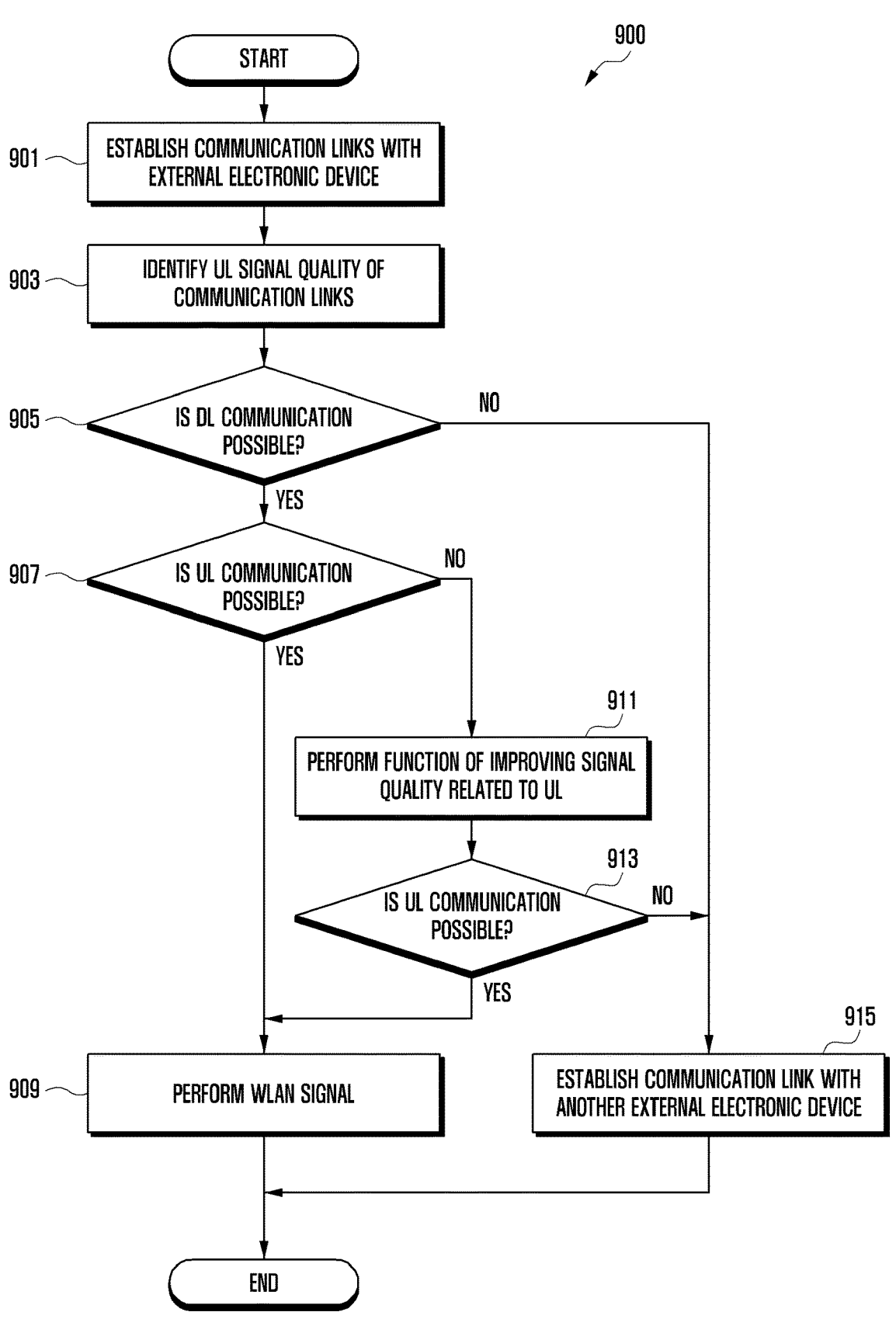
FIG. 9 is a flowchart illustrating a process in which an electronic device improves a UL signal quality according to various embodiments.

FIG. 9 is a flowchart 900 illustrating a process in which an electronic device improves a UL signal quality according to various embodiments. In the following embodiments, respective operations may be sequentially performed but the sequential performance is not necessary. For example, orders of the operations may be changed, and at least two operations may be performed in parallel. For example, the electronic device of FIG. 9 may be the electronic device 101 of FIG. 1, 2, or 3.

According to various embodiments referring to FIG. 9, an electronic device (for example, the electronic device 101 of FIG. 1, FIG. 2, or FIG. 3) or a processor (for example, the processor 120 of FIG. 1 or the processor 300 of FIG. 3) may establish (set up) communication links (for example, the first link 231, the second link 232, or the third link 233 of FIG. 2) with an external electronic device (for example, the external electronic device 220 of FIG. 2) in operation 901. According to an embodiment, the processor 300 may control the communication circuit 310 to establish a single communication link with the external electronic device 220 through one frequency band (or link) among a plurality of frequency bands supported by the electronic device 101.

According to various embodiments, the electronic device (for example, the electronic device 101) or the processor (for example, the processor 120 or 300) may identify a downlink (DL) signal quality and an uplink (UL) signal quality of communication links with the external electronic device 220 in operation 903. According to an embodiment, when it is determined that the electronic device 101 is located in the NLOS environment from the external electronic device 220 on the basis of channel state information (CSI) with the external electronic device 220, the processor 300 may identify the DL signal quality and the UL signal quality. According to an embodiment, when it is determined that a UL retransmission rate with the external electronic device 220 is satisfied with a predetermined signal quality identification condition, the processor 300 may identify the DL signal quality of and the UL signal quality. According to an embodiment, it is determined that the DL signal quality with the external electronic device 220 is satisfied with the predetermined signal quality identification condition, the processor 300 may identify the UL signal quality. According to an embodiment, when a transmission period of the sounding signal of the electronic device 101 arrives, the processor 300 may identify the DL signal quality and the UL signal quality.

According to an embodiment, the processor 300 may identify (or estimate) the DL signal quality on the basis of a signal received from the external electronic device 220. For example, the DL signal quality of each link may include at least one of information (for example, standard type) related to the standard of WLAN communication (for example, Wi-Fi), the number of spatial streams allowed by the external electronic device 220, information related to transmission power of the external electronic device 220, the number of spatial streams allowed by the electronic device 101, received signal strength (for example, a received signal strength indicator (RSSI)), a signal to noise ratio (SNR), a reception speed of a link (for example, a link speed), a channel utilization rate (channel utilization), a clear channel assessment (CCA) busy time, or a wireless communication active time (ratio on time). For example, the DL signal quality may include DL throughput estimated on the basis of the DL data rate as shown in [Table 1].

According to an embodiment, the processor 300 may identify (or estimate) a UL signal quality of each link on the basis of a UL signal such as a sounding signal, a domain name system (DNS) query, or a hypertext transfer protocol (HTTP) request. For example, the UL signal quality of each link may include UL throughput of each link estimated on the basis of a UL data rate as shown in [Equation 3] below.

According to various embodiments, the electronic device (for example, the electronic device 101) or the processor (for example, the processor 120 or 300) may identify whether DL communication with the external electronic device 220 is possible on the basis of the DL signal quality with the external electronic device 220 in operation 905. According to an embodiment, when DL throughput with the external electronic device 220 is larger than predetermined first reference throughput, the processor 300 may determine that DL communication is possible. According to an embodiment, when the DL throughput with the external electronic device 220 is equal to or lower than the predetermined first reference throughput, the processor 300 may determine that DL communication is impossible. For example, the predetermined first reference throughput may include information related to a reference for determining whether DL communication is possible.

According to various embodiments, when it is determined that DL communication with the external electronic device 220 is possible (for example, 'Yes' in operation 905), the electronic device (for example, the electronic device 101) or the processor (for example, the processor 120 or 300) may identify UL communication with the external electronic device 220 is possible on the basis of the UL signal quality with the external electronic device 220 in operation 907. According to an embodiment, when UL throughput with the external electronic device 220 is higher than predetermined second reference throughput, the processor 300 may determine that UL communication is possible. According to an embodiment, when UL throughput with the external electronic device 220 is equal to or lower than the predetermined second reference throughput, the processor 300 may determine that the UL communication is impossible. For example, the second reference throughput is a reference for determining whether UL communication is possible and may be the same as or different from the predetermined first reference throughput According to various embodiments, when it is determined that UL communication with the external electronic device 220 is possible (for example, 'Yes' in operation 907), the electronic device (for example, the electronic device 101) or the processor (for example, the processor 120 or 300) may perform WLAN communication with the external electronic device 220 in operation 909.

According to various embodiments, when it is determined that UL communication with the external electronic device 220 is impossible (for example, 'No' in operation 907), the electronic device (for example, the electronic device 101) or the processor (for example, the processor 120 or 300) may perform a function for improving the UL signal quality in operation 911. For example, the function for improving the UL signal quality may include at least one of the application of dual carrier modulation (DCM) to the UL, the use of an extended range physical protocol data unit (PPDU), expansion of a guard interval (GI), or the use of a diversity mode.

According to various embodiments, the electronic device (for example, the electronic device 101) or the processor (for example, the processor 120 or 300) may identify whether UL communication with the external electronic device 220 is possible on the basis of the application of the function for improving the UL signal quality in operation 913.

According to various embodiments, when it is determined that UL communication with the external electronic device 220 is possible (for example, 'Yes' in operation 913), the electronic device (for example, the electronic device 101) or the processor (for example, the processor 120 or 300) may perform WLAN communication with the external electronic device 220 in operation 909.

According to various embodiments, when it is determined that DL communication with the external electronic device 220 is impossible (for example, 'No' in operation 905) or UL communication with the external electronic device 220 is impossible (for example, 'No' in operation 913), the electronic device (for example, the electronic device 101) or the processor (for example, the processor 120 or 300) may perform WLAN communication through another external electronic device in operation 915. According to an embodiment, when it is determined that DL communication with the external electronic device 220 is impossible (for example, 'No' in operation 905), the processor 300 may control the communication circuit 310 to move (for example, roaming) to the other electronic device. According to an embodiment, when the function for improving the UL signal quality is applied but it is determined that UL communication with the external electronic device 220 is impossible (for example, 'No' in operation 913), the processor 300 may control the communication circuit 310 to move (for example, roaming) to the other external electronic device. According to an embodiment, the processor 300 may control the communication circuit 310 to identify whether there is another external electronic device (for example, another AP) which the electronic device 101 can access through a scan. For example, when another external electronic device which the electronic device 101 can access is detected through the scan, the processor 300 may control the communication circuit 310 to establish a communication link with the other electronic device. The processor 300 may control the communication circuit 310 to perform WLAN communication through a communication link with the other external electronic device.

According to various embodiments, when no other external electronic device which the electronic device 101 can access is detected through the scan, the electronic device 101 may determine that WLAN communication cannot be provided. The electronic device 101 may perform cellular communication on the basis of determination that WLAN communication cannot be provided.

According to various embodiments a method of operating an electronic device (for example, the electronic device 101 of FIG. 1, FIG. 2, or FIG. 3) may include an operation of establishing a plurality of links (for example, the first link 231, the second link 232, and/or the third link 233 of FIG. 2) for WLAN communication with an external electronic device (for example, the electronic device 102 of FIG. 1 or the external electronic device 220 of FIG. 2). According to an embodiment, the method of operating the electronic device may include an operation of identifying a downlink (DL) signal quality and an uplink (UL) signal quality of each of the plurality of links. According to an embodiment, the method of operating the electronic device may include an operation of detecting at least one DL satisfying a predetermined first reference signal quality among the plurality of links based on the DL signal quality. According to an embodiment, the method of operating the electronic device may include an operation of, when no link satisfying a predetermined second reference signal quality is detected among the plurality of links based on the UL signal quality, performing a function related to improvement of UL signal qualities for the plurality of links. According to an embodiment, the method of operating the electronic device may include an operation of detecting at least one UL satisfying the predetermined second reference signal quality, based on the performance of the function related to the improvement of the UL signal quality among the plurality of links. According to an embodiment, the method of operating the electronic device may include an operation of performing the WLAN communication with the external electronic device, based on the at least one DL and the at least one UL.

According to various embodiments, the method of operating the electronic device may include an operation of, when no link satisfying the predetermined first reference signal quality is detected among the plurality of links based on the DL signal quality, performing access to another external electronic device or switching to a cellular network.

According to various embodiments, the method of operating the electronic device may include an operation of, when no link having the UL signal quality satisfying the predetermined second reference signal quality is detected among the plurality of links based on the UL signal quality after the performance of the function related to the improvement of the UL signal, performing access to another external electronic device or switching to a cellular network.

According to various embodiments, the method of operating the electronic device may include an operation of allocating at least one TID to the at least one DL and the at least one UL through TID link mapping (for example, TID to link mapping) and an operation of performing the WLAN communication with the external electronic device, based on the at least one DL and the at least one UL to which the at least one TID is allocated.

According to various embodiments, the method of operating the electronic device may include an operation of switching a DL function of at least one remaining DL except for the at least one DL among the plurality of links to an inactive state through the TID link mapping.

According to various embodiments, the method of operating the electronic device may include an operation of switching a UL function of at least one remaining UL except for the at least one UL among the plurality of links to an inactive state through the TID link mapping.

According to various embodiments, when a non-line of sight (NLOS) detection condition is satisfied, based on channel state information of at least one link among the plurality of links, the operation of identifying the DL signal quality and the UL signal quality may include an operation of identifying a DL signal quality and a UL signal quality of each of the plurality of links.

According to various embodiments, when a UL retransmission rate and/or a number of failures of at least one link among the plurality of links are satisfied with a predetermined signal quality identification condition, the operation of identifying the DL signal quality and the UL signal quality may include an operation of identifying the DL signal quality and the UL signal quality of each of the plurality of links.

According to various embodiments, the operation of identifying the DL signal quality and the UL signal quality may include an operation of identifying a DL signal quality of each of the plurality of links and an operation of, when a DL signal quality of at least one of the plurality of links is satisfied with the predetermined signal quality identification condition, identifying a UL signal quality of each of the plurality of links.

According to various embodiments, a method of operating an electronic device (for example, the electronic device 101 of FIG. 1, FIG. 2, or FIG. 3) may include an operation of establishing communication links with an external electronic device (for example, the electronic device 102 of FIG. 1 or the external electronic device 220 of FIG. 2), based on WLAN communication. According to an embodiment, the method of operating the electronic device may include identifying a downlink (DL) signal quality and an uplink (UL) signal quality. According to an embodiment, the method of operating the electronic device may include determining that DL communication with the external electronic device is possible, based on the DL signal quality. According to an embodiment, the method of operating the electronic device may include performing a function related to improvement of the UL signal quality in a case that it is determined UL communication with the external electronic device is impossible, based on the UL signal quality. According to an embodiment, the method of operating the electronic device may include, in a case that it is determined that UL communication with the external electronic device is possible, based on performance of the function related to improvement of the UL signal quality, performing WLAN communication with the external electronic device.

Embodiments of the disclosure in the specifications and drawings are presented to easily describe the technical content according to embodiments of the disclosure and provide specific examples for helping understanding of embodiments of the disclosure, but do not intent to limit the scope of the embodiments of the disclosure. Therefore, the range of various embodiments of the disclosure should be construed such that all changes or changed forms derived on the basis of the technical idea of various embodiments of the disclosure as well as the embodiments disclosed herein are included in the range of various embodiments of the disclosure.

The invention claimed is:

1. An electronic device comprising:
memory storing instructions;
communication circuitry configured to support wireless local area network (WLAN) communication; and
a processor operatively connected to the communication circuitry,
wherein the instructions, when executed by the processor, cause the electronic device to:
establish a plurality of links with an external electronic device through the communication circuitry;
identify a downlink (DL) signal quality and an uplink (UL) signal quality of each of the plurality of links, wherein the DL signal quality includes DL throughput, and the UL signal quality includes UL throughput;
in a case that at least one DL exceeding a predetermined first reference throughput is detected among the plurality of links based on the DL throughput, and no UL exceeding a predetermined second reference throughput is detected among the plurality of links based on the UL throughput, perform a function related to improvement of UL signal qualities for the plurality of links; and
based on the result of performing the function related to the improvement of the UL signal quality, while at least one DL is detected as exceeding the predetermined first reference throughput:
when at least one UL exceeding the predetermined second reference throughput is detected among the plurality of links, allocate at least one traffic identifier (TID) to the at least one DL and the at least one UL through TID link mapping, and perform the WLAN communication with the external electronic device, based on the at least one DL and the at least one UL to which the at least one TID is allocated, wherein a DL function of at least one remaining DL other than the at least one DL is switched to an inactive state through the TID link mapping, and a UL function of at least one remaining UL other than the at least one UL is switched to an inactive state through the TID link mapping, and
when no UL exceeding the predetermined second reference throughput is detected among the plurality of links, perform access to another external electronic device or switch to a cellular network.

2. The electronic device of claim 1, wherein the instructions, when executed by the processor, cause the electronic device to, in a case that no DL exceeding the predetermined first reference throughput is detected among the plurality of links based on the DL throughput, perform access to another external electronic device or switching to a cellular network.

3. The electronic device of claim 1, wherein the instructions, when executed by the processor, cause the electronic device to, in a case that a non-line of sight (NLOS) detection condition is satisfied, based on channel state information of at least one link among the plurality of links, identify a DL signal quality and a UL signal quality of each of the plurality of links.

4. The electronic device of claim 1, wherein the instructions, when executed by the processor, cause the electronic device to, in a case that a UL retransmission rate or a number of failures of at least one link among the plurality of links are satisfied with a predetermined signal quality identification condition, identify the DL signal quality and the UL signal quality of each of the plurality of links.

5. The electronic device of claim 1, wherein the instructions, when executed by the processor, cause the electronic device to:
identify the DL signal quality of each of the plurality of links; and
in a case that the DL signal quality of at least one link among the plurality of links is satisfied with a predetermined signal quality identification condition, identify the UL signal quality of each of the plurality of links.

6. The electronic device of claim 1, wherein the function related to improvement of UL signal qualities includes at least one of application of dual carrier modulation (DCM) to the at least one UL, using an extended range physical protocol data unit (PPDU), using a multi-link (ML) duplication mode, expansion of a guard interval (GI), or using a diversity mode.

7. The electronic device of claim 1, wherein the UL signal quality is identified based on at least one of a sounding signal, a domain name system (DNS) query, or a hypertext transfer protocol (HTTP) request.

8. A method of operating an electronic device, the method comprising:

establishing a plurality of links with an external electronic device through wireless local area network (WLAN) communication;

identifying a downlink (DL) signal quality and an uplink (UL) signal quality of each of the plurality of links, wherein the DL signal quality includes DL throughput, and the UL signal quality includes UL throughput;

in a case that at least one DL exceeding a predetermined first reference throughput is detected among the plurality of links based on the DL throughput and no UL exceeding a predetermined second reference throughput is detected among the plurality of links based on the UL throughput, performing a function related to improvement of UL signal qualities for the plurality of links; and based on the result of performing the function related to improvement of UL signal quality, while at least one DL is detected as exceeding the predetermined first reference throughput:

when at least one UL exceeding the predetermined second reference throughput is detected among the plurality of links, allocating at least one traffic identifier (TID) to the at least one DL and the at least one UL through TID link mapping, and performing the WLAN communication with the external electronic device, based on the at least one DL and the at least one UL to which the at least one TID is allocated, wherein a DL function of at least one remaining DL other than the at least one DL is switched to an inactive state through the TID link mapping, and a UL function of at least one remaining UL other than the at least one UL is switched to an inactive state through the TID link mapping; and when no UL exceeding the predetermined second reference throughput is detected among the plurality of links, performing access to another external electronic device or switching to a cellular network.

9. The method of claim 8, further comprising, in a case that no DL exceeding the predetermined first reference throughput is detected among the plurality of links based on the DL throughput, performing access to another external electronic device or switching to a cellular network.

10. The method of claim 8, wherein the identifying of the DL signal quality and the UL signal quality comprises, in a case that a non-line of sight (NLOS) detection condition is satisfied based on channel state information of at least one link among the plurality of links, identifying a DL signal quality and a UL signal quality of each of the plurality of links.

11. The method of claim 8, wherein the identifying of the DL signal quality and the UL signal quality comprises, in a case that a UL retransmission rate or a number of failures of at least one link among the plurality of links are satisfied with a predetermined signal quality identification condition, identifying the DL signal quality and the UL signal quality of each of the plurality of links.

12. The method of claim 8, wherein the identifying the DL signal quality and the UL signal quality comprises:

identifying the DL signal quality of each of the plurality of links; and in a case that the DL signal quality of at least one link among the plurality of links is satisfied with a predetermined signal quality identification condition, identifying the UL signal quality of each of the plurality of links.

13. The method of claim 8, wherein the function related to improvement of UL signal qualities includes at least one of application of dual carrier modulation (DCM) to the at least one UL, using an extended range physical protocol data unit (PPDU), using a multi-link (ML) duplication mode, expansion of a guard interval (GI), or using a diversity mode.

14. The method of claim 8, wherein the UL signal quality is identified based on at least one of a sounding signal, a domain name system (DNS) query, or a hypertext transfer protocol (HTTP) request.

* * * * *